(12) United States Patent
Zhang et al.

(10) Patent No.: US 10,555,006 B2
(45) Date of Patent: Feb. 4, 2020

(54) DERIVING BILATERAL FILTER INFORMATION BASED ON A PREDICTION MODE IN VIDEO CODING

(71) Applicant: QUALCOMM Incorporated, San Diego, CA (US)

(72) Inventors: Li Zhang, San Diego, CA (US); Wei-Jung Chien, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/851,219

(22) Filed: Dec. 21, 2017

(65) Prior Publication Data

US 2018/0184126 A1    Jun. 28, 2018

Related U.S. Application Data

(60) Provisional application No. 62/438,360, filed on Dec. 22, 2016, provisional application No. 62/440,834, filed on Dec. 30, 2016.

(51) Int. Cl.
*H04N 19/82*    (2014.01)
*H04N 19/13*    (2014.01)
*H04N 19/176*   (2014.01)

(52) U.S. Cl.
CPC .............. *H04N 19/82* (2014.11); *H04N 19/13* (2014.11); *H04N 19/176* (2014.11)

(58) Field of Classification Search
CPC ........ H04N 9/045; H04N 5/365; H04N 9/735; H04N 5/142; H04N 5/23229; H04N 9/64;
(Continued)

(56) References Cited

U.S. PATENT DOCUMENTS 9,426,472 B2    8/2016  Kim et al.
9,544,593 B2 *  1/2017  Park .................... H04N 19/105
(Continued)

FOREIGN PATENT DOCUMENTS

WO    2013064547 A1    5/2013

OTHER PUBLICATIONS

International Search Report and Written Opinion—PCT/US2017/068279—ISA/EPO—dated Apr. 30, 2018.
(Continued)

*Primary Examiner* — Dave Czekaj
*Assistant Examiner* — Kehinde Abimbola
(74) *Attorney, Agent, or Firm* — Shumaker & Sieffert, P.A.

(57) ABSTRACT

A device for decoding video data determines mode information for a current block of a current picture of the video data; derives weights for use in a bilateral filter based on the mode information for the current block; applies the bilateral filter to a current sample of the current block by assign the weights to neighboring samples of the current sample of the current block and the current sample of the current block and modifying a sample value for the current sample based on sample values of the neighboring samples, the weights assigned to the neighboring samples, the sample value for the current sample, and the weight assigned to the current sample; and based on the modified sample value for the current sample, outputs a decoded version of the current picture.

27 Claims, 10 Drawing Sheets

(58) Field of Classification Search
CPC ........... H04N 2213/003; H04N 13/271; H04N 2209/046; H04N 19/176; H04N 19/70; H04N 19/159; H04N 19/52; H04N 19/44; H04N 19/513; H04N 19/105; H04N 19/61; H04N 19/30; H04N 19/463; H04N 19/46; H04N 19/172; H04N 19/593; H04N 19/103

See application file for complete search history.

(56) References Cited

U.S. PATENT DOCUMENTS

| | | | |
|---|---|---|---|
| 9,591,306 | B2 | 3/2017 | Wedi et al. |
| 9,641,729 | B2* | 5/2017 | Zhang .................... H04N 5/213 |
| 9,654,777 | B2 | 5/2017 | Guo et al. |
| 2005/0025378 | A1* | 2/2005 | Maurer ................... G06T 5/002 382/260 |
| 2008/0104158 | A1* | 5/2008 | Farhoodfar ........ H03H 21/0027 708/405 |
| 2008/0118173 | A1* | 5/2008 | Maurer ................... G06T 5/002 382/260 |
| 2009/0087110 | A1 | 4/2009 | Tourapis et al. |
| 2011/0038413 | A1* | 2/2011 | Chen .................... H04N 19/105 375/240.12 |
| 2011/0115886 | A1 | 5/2011 | Nguyen et al. |
| 2011/0142132 | A1* | 6/2011 | Tourapis .............. H04N 19/597 375/240.16 |
| 2011/0235945 | A1 | 9/2011 | Wakazono et al. |
| 2012/0195492 | A1 | 8/2012 | Ali et al. |
| 2012/0288192 | A1 | 11/2012 | Heidrich et al. |
| 2013/0003832 | A1 | 1/2013 | Li et al. |
| 2013/0286288 | A1* | 10/2013 | Zhang .................... H04N 5/213 348/608 |
| 2013/0321672 | A1 | 12/2013 | Silverstein et al. |
| 2013/0321675 | A1 | 12/2013 | Cote et al. |
| 2013/0322745 | A1 | 12/2013 | Lim et al. |
| 2014/0002670 | A1 | 1/2014 | Kolarov et al. |
| 2014/0003522 | A1* | 1/2014 | Park ..................... H04N 19/105 375/240.16 |
| 2014/0029849 | A1 | 1/2014 | Sen et al. |
| 2014/0044161 | A1 | 2/2014 | Chen et al. |
| 2014/0146875 | A1 | 5/2014 | Chong et al. |
| 2014/0293096 | A1* | 10/2014 | Wang ......................... G06T 5/20 348/241 |
| 2014/0369428 | A1* | 12/2014 | Park ..................... H04N 19/159 375/240.29 |
| 2017/0238020 | A1 | 8/2017 | Karczewicz et al. |
| 2017/0302950 | A1* | 10/2017 | Xu .......................... H04N 19/52 |
| 2017/0324978 | A1* | 11/2017 | Xu ........................ H04N 19/513 |
| 2018/0054628 | A1* | 2/2018 | Pettersson ............ H04N 19/172 |
| 2018/0084255 | A1* | 3/2018 | Tourapis .............. H04N 19/573 |
| 2018/0184127 | A1 | 6/2018 | Zhang et al. |
| 2018/0309988 | A1* | 10/2018 | Alshina ................ H04N 19/102 |
| 2018/0367793 | A1* | 12/2018 | Park ........................ H04N 19/11 |
| 2019/0268617 | A1* | 8/2019 | Xu .......................... H04N 19/52 |

OTHER PUBLICATIONS

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Wang Y-K. et al., "High Efficiency Video Coding (HEVC) Defect Report," Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pages.
Chen J., et al., "Algorithm Description of Joint Exploration Test Model 3," Document: JVET-C1001_v3, Joint Video Exploration Team (JVET) of ITU-T SG 16 WP 3 and ISO/IEC JTC 1/SC 29/WG 11, 3rd Meeting: Geneva, CH, May 26-Jun. 1, 2016, 37 Pages.
Bross B., et al., "High Efficiency Video Coding (HEVC) Text Specification Draft 10 (for FDIS & Last Call)," 12th Meeting: Geneva, CH, Jan. 14-23, 2013, (Joint Collaborative Team on Video Coding of ISO/IEC JTC 1/SC 29/WG 11 and ITU-T SG 16 WP 3); JCTVC-L1003_v34, Mar. 19, 2013, 310 pages.
Fu et al., "Sample Adaptive Offset in the HEVC Standard," IEEE Transactions on Circuits and Systems for Video Technology, Dec. 2012, vol. 22, No. 12, pp. 1755-1764.
Karczewicz M., et al., "Improvements on Adaptive Loop Filter," Joint Video Exploration Team (JVET) of ITU-T SG 16 WP 3 and ISO/IEC JTC 1/SC 29/WG 11, Document: JVET-B0060-v2, 2nd Meeting: San Diego, USA, Feb. 20-26, 2016, XP030150068, URL: http://PHENIX.INT-EVRY.FR/JVET/ 6 pages.
Karczewicz M., et al., "EE2.5: Improvements on Adaptive Loop Filter," Joint Video Exploration Team (JVET) of ITU-T SG 16 WP 3 and ISO/IEC JTC 1/SC 29/WG 11, Document: JVET-C0038, 3rd Meeting: Geneva, CH, May 26-Jun. 1, 2016, 4 pages.
Norkin A., et al., "HEVC Deblocking Filter," IEEE Transactions on Circuits and Systems for Video Technology, Dec. 1, 2012 (Dec. 1, 2012), vol. 22, No. 12, pp. 1746-1754, XP011487156.
Strom, et al., "Bilateral Filter After Inverse Transform," Joint Video Exploration Team (JVET) of ITU-T SG 16 WP 3 and ISO/IEC JTC 1/SC 29/WG 11, Document: JVET-D0069, Oct. 15-21, 2016, 5 pp.
Tomasi, et al., "Bilateral Filtering for Gray and Color Images," pp. 839-846, Jan. 1998.
U.S. Appl. No. 15/851,358, filed by Li Zhang, filed Dec. 21, 2017.
Marpe D., et al., "Context-Based Adaptive Binary Arithmetic Coding in the H.264/AVC Video Compression Standard," IEEE Transactions on Circuits and Systems for Video Technology, vol. 13, No. 7, Jul. 1, 2003, pp. 620-636, XP055120073, ISSN: 1051-8215, DOI: 10.1109/TCSVT.2003.815173.
Partial International Search Report—PCT/US2017/068279—ISA/EPO—dated Mar. 5, 2018.
Raffin E., et al., "Low Power HEVC Software Decoder for Mobile Devices," Journal of Real-time Image Processing, Springer, DE, vol. 12, No. 2, Jun. 6, 2015 (Jun. 6, 2015), pp. 495-507, XP036018724, ISSN: 1861-8200, DOI: 10.1007/S11554-015-0512-8 [retrieved on Jun. 6, 2015].
Sekiguchi S-I., et al., "Syntax for Error Resilient CABAC Stream," 3th JVT Meeting; 60th MPEG Meeting; Jun. 5, 2002-Oct. 5, 2002; Fairfax, US; (Joint Video Team of ISO/IEC JTC1/SC29/WG11 and ITU-T SG.16 ),, No. JVT-C098, May 10, 2002 (May 10, 2002), XP030005206, 9 pages.
Sullivan G.J., et al., "Overview of the High Efficiency Video Coding (HEVC) Standard," IEEE Transactions on Circuits and Systems for Video Technology, vol. 22, No. 12, Dec. 1, 2012 (Dec. 1, 2012), XP55388661, USA ISSN: 1051-8215, DOI: 10.1109/TCSVT.2012.2221191, pp. 1649-1668.
Response to Non-Final Office Action in U.S. Appl. No. 15/851,358, dated Aug. 20, 2019, 16 pgs.
International Preliminary Report on Patentability—PCT/US2017/068279, The International Bureau of WIPO—Geneva, Switzerland, dated Jul. 4, 2019 13 pgs.
Non-Final Rejection in U.S. Appl. No. 15/851,358, dated May 20, 2019, 19 pgs.

* cited by examiner

SF  Sample to be filtered

VS  Virtual samples

NS  Neighboring sample

DERIVING BILATERAL FILTER INFORMATION BASED ON A PREDICTION MODE IN VIDEO CODING

This Application claims the benefit of:
U.S. Provisional Patent Application 62/438,360, filed Dec. 22, 2016; and
U.S. Provisional Patent Application 62/440,834, filed Dec. 30, 2016, the entire content of each being incorporated herein by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the ITU-T H.265, High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized.

SUMMARY

In general, this disclosure describes filtering techniques that may be used in a post-processing stage, as part of in-loop coding, or in a prediction stage of video coding. The filtering techniques of this disclosure may be applied to existing video codecs, such as High Efficiency Video Coding (HEVC), or be an efficient coding tool in any future video coding standards.

According to one example, a method for decoding video data includes determining mode information for a current block of a current picture of the video data; deriving weights for use in a bilateral filter based on the mode information for the current block; applying the bilateral filter to a current sample of the current block, wherein applying the bilateral filter to the current sample comprises: assigning the weights to neighboring samples of the current sample of the current block and the current sample of the current block; and modifying a sample value for the current sample based on sample values of the neighboring samples, the weights assigned to the neighboring samples, the sample value for the current sample, and the weight assigned to the current sample; and based on the modified sample value for the current sample, outputting a decoded version of the current picture.

According to another example, a device for decoding video data includes one or more storage media configured to store the video data and one or more processors configured to determine mode information for a current block of a current picture of the video data; derive weights for use in a bilateral filter based on the mode information for the current block; apply the bilateral filter to a current sample of the current block, wherein to apply the bilateral filter to the current sample, the one or more processors are further configured to: assign the weights to neighboring samples of the current sample of the current block and the current sample of the current block; and modify a sample value for the current sample based on sample values of the neighboring samples, the weights assigned to the neighboring samples, the sample value for the current sample, and the weight assigned to the current sample; and based on the modified sample value for the current sample, output a decoded version of the current picture.

According to another example, a computer readable storage medium stores instructions that when executed by one or more processors cause the one or more processors to determine mode information for a current block of a current picture of the video data; derive weights for use in a bilateral filter based on the mode information for the current block; apply the bilateral filter to a current sample of the current block, wherein to apply the bilateral filter to the current sample, the instructions cause the one or more processors to: assign the weights to neighboring samples of the current sample of the current block and the current sample of the current block; and modify a sample value for the current sample based on sample values of the neighboring samples, the weights assigned to the neighboring samples, the sample value for the current sample, and the weight assigned to the current sample; and based on the modified sample value for the current sample, output a decoded version of the current picture.

According to another example, an apparatus for decoding video data includes means for determining mode information for a current block of a current picture of the video data; means for deriving weights for use in a bilateral filter based on the mode information for the current block; means for applying the bilateral filter to a current sample of the current block, wherein applying the bilateral filter to the current sample comprises: means for assigning the weights to neighboring samples of the current sample of the current block and the current sample of the current block; and means for modifying a sample value for the current sample based on sample values of the neighboring samples, the weights assigned to the neighboring samples, the sample value for the current sample, and the weight assigned to the current sample; and means for outputting a decoded version of the current picture based on the modified sample value for the current sample.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

Figure 1:
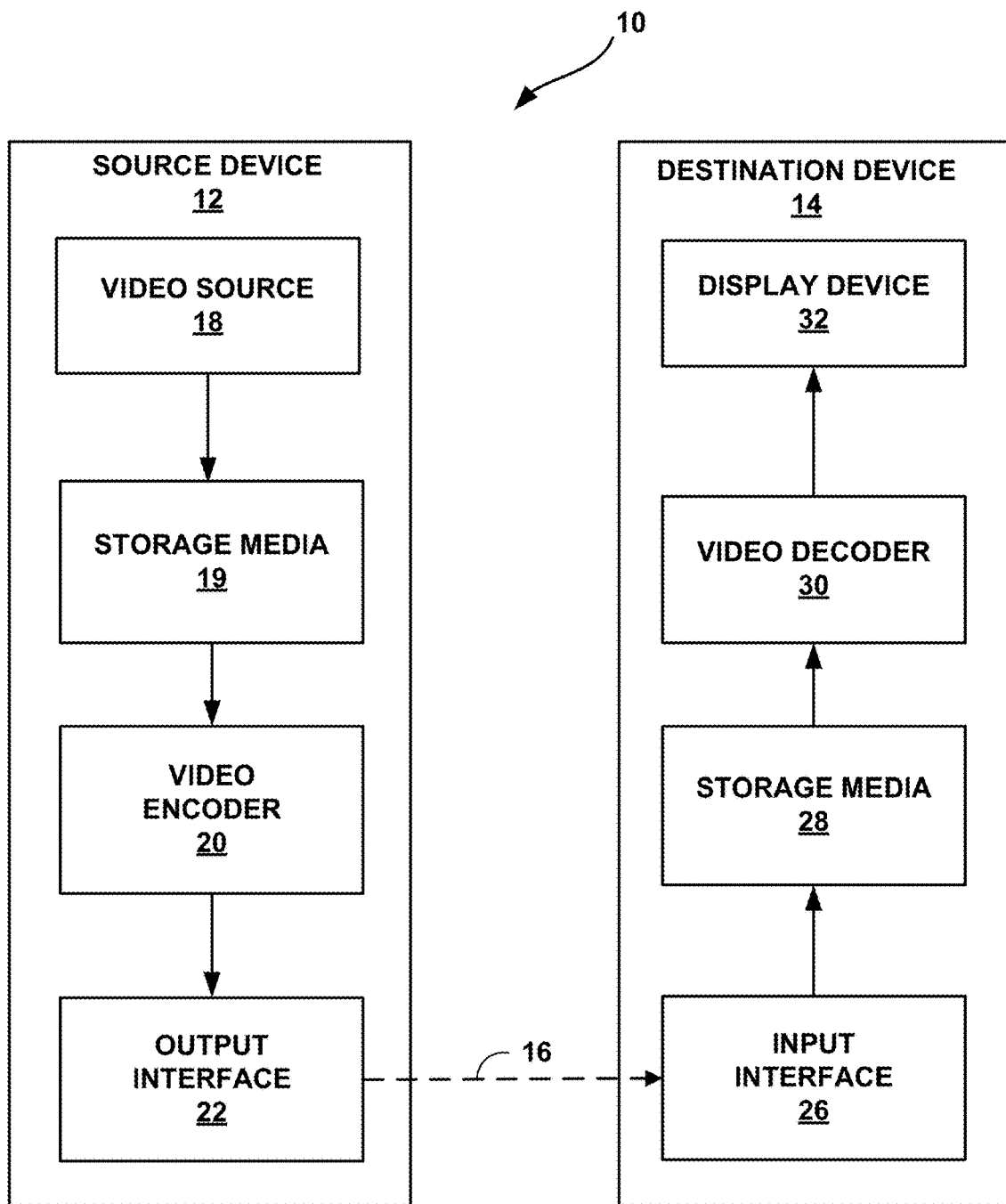
FIG. 1 is a block diagram illustrating an example video encoding and decoding system that may utilize one or more techniques described in this disclosure.

Video coding (e.g., video encoding or video decoding) typically involves predicting a block of video data using a prediction mode. Two common prediction modes involve predicting blocks from either an already coded block of video data in the same picture (i.e. an intra prediction mode) or an already coded block of video data in a different picture (i.e. an inter prediction mode). Other predictions modes, such as an intra block copy mode, a palette mode, or a dictionary mode, may also be used. In some instances, the video encoder also calculates residual data by comparing the predictive block to the original block. Thus, the residual data represents a difference between the predictive block and the original block. The video encoder transforms and quantizes the residual data and signals the transformed and quantized residual data in the encoded bitstream.

A video decoder dequantizes and inverse transforms the received residual data to determine the residual data calculated by the video encoder. As transformation and quantization can be lossy processes, the residual data determined by the video decoder may not exactly match the residual data calculated by the encoder. A video decoder adds the residual data to the predictive block to produce a reconstructed video block that matches the original video block more closely than the predictive block alone. To further improve the quality of decoded video, a video decoder can perform one or more filtering operations on the reconstructed video blocks. The High Efficiency Video Coding (HEVC) standard, for example, utilizes deblocking filtering and sample adaptive offset (SAO) filtering. Other types of filtering such as adaptive loop filtering (ALF) may also be used. Parameters for these filtering operations may either be determined by a video encoder and explicitly signaled in the encoded video bitstream or may be implicitly determined by a video decoder without needing the parameters to be explicitly signaled in the encoded video bitstream.

Another type of filtering proposed for inclusion in future generation video coding standards is bilateral filtering. In bilateral filtering, weights are assigned to neighboring samples of a current sample and the current sample, and based on the weights, the values of the neighboring samples, and the value of the current sample, the value of the current sample may be modified, i.e., filtered. Although bilateral filtering may be applied with other filters in any combination or permutation, bilateral filtering is typically applied right after the reconstruction of one block, such that the filtered block may be used for coding/decoding following blocks. That is, the bilateral filter may be applied before deblocking filter. In other example, bilateral filtering may be applied right after reconstruction of a block and before coding following blocks, or right before deblocking filter, or after deblocking filter, or after SAO or after ALF.

Deblocking filtering smoothes the transitions around the edges of blocks to avoid decoded video having a blocky look. Bilateral filtering typically does not filter across block boundaries, but instead, only filters samples within a block. The bilateral filter may, for example, improve overall video coding quality by helping to avoid undesirable over-smoothing caused by deblocking filtering in some coding scenarios.

This disclosure describes techniques related to bilateral filtering. As one example, this disclosure describes techniques related to utilizing mode information, such as prediction mode information or other mode information, to derive bilateral filter parameters, such as weights. By deriving weights for use in bilateral filtering based on the mode information for a current block, as set forth in this disclosure, a video encoder or video decoder may be able to derive weights that improve the overall quality of bilateral filtering compared to existing techniques for deriving weights.

As another example, this disclosure describes techniques related to applying bilateral filtering using neighboring samples located outside of a transform unit boundary. By assigning the weights to neighboring samples of the current sample of the current block, wherein at least one of the current neighboring samples is located outside the transform unit boundary, as set forth in this disclosure, a video encoder or video decoder may be able to apply bilateral filtering in a manner that improves the overall quality of bilateral filtering compared to existing techniques for applying bilateral filters. Thus, by implementing bilateral filtering techniques of this disclosure, video encoders and video decoders may potentially achieve better rate distortion tradeoffs compared to existing video encoders and video decoders.

As used in this disclosure, the term video coding generically refers to either video encoding or video decoding. Similarly, the term video coder may generically refer to a video encoder or a video decoder. Moreover, certain techniques described in this disclosure with respect to video decoding may also apply to video encoding, and vice versa. For example, often times video encoders and video decoders are configured to perform the same process, or reciprocal processes. Also, video encoders typically perform video decoding as part of the processes of determining how to encode video data. Therefore, unless explicitly stated to the contrary, it should not be assumed that a technique described with respect to video decoding cannot also be performed by a video encoder, or vice versa.

This disclosure may also use terms such as current layer, current block, current picture, current slice, etc. In the context of this disclosure, the term current is intended to identify a block, picture, slice, etc. that is currently being coded, as opposed to, for example, previously or already coded blocks, pictures, and slices or yet to be coded blocks, pictures, and slices.

FIG. 1 is a block diagram illustrating an example video encoding and decoding system 10 that may utilize the bilateral filtering techniques of this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, tablet computers, televisions, cameras, display devices, digital media players, video gaming consoles, video streaming device, or the like. In some cases, source device 12 and destination device 14 may be equipped for wireless communication. Thus, source device 12 and destination device 14 may be wireless communication devices. Source device 12 is an example video encoding device (i.e., a device for encoding video data). Destination device 14 is an example video decoding device (i.e., a device for decoding video data).

In the example of FIG. 1, source device 12 includes a video source 18, storage media 19 configured to store video data, a video encoder 20, and an output interface 22. Destination device 14 includes an input interface 26, a storage media 28 configured to store encoded video data, a video decoder 30, and a display device 32. In other examples, source device 12 and destination device 14 include other components or arrangements. For example, source device 12 may receive video data from an external video source, such as an external camera. Likewise, destination device 14 may interface with an external display device, rather than including an integrated display device.

The illustrated system 10 of FIG. 1 is merely one example. Techniques for processing video data may be performed by any digital video encoding and/or decoding device. Although generally the techniques of this disclosure are performed by a video encoding device or a video decoding device, the techniques may also be performed by a video encoder/decoder, typically referred to as a "CODEC." Source device 12 and destination device 14 are merely examples of such coding devices in which source device 12 generates coded video data for transmission to destination device 14. In some examples, source device 12 and destination device 14 may operate in a substantially symmetrical manner such that each of source device 12 and destination device 14 include video encoding and decoding components. Hence, system 10 may support one-way or two-way video transmission between source device 12 and destination device 14, e.g., for video streaming, video playback, video broadcasting, or video telephony.

Video source 18 of source device 12 may include a video capture device, such as a video camera, a video archive containing previously captured video, and/or a video feed interface to receive video data from a video content provider. As a further alternative, video source 18 may generate computer graphics-based data as the source video, or a combination of live video, archived video, and computer-generated video. Source device 12 may comprise one or more data storage media (e.g., storage media 19) configured to store the video data. The techniques described in this disclosure may be applicable to video coding in general, and may be applied to wireless and/or wired applications. In each case, the captured, pre-captured, or computer-generated video may be encoded by video encoder 20. Output interface 22 may output the encoded video information to a computer-readable medium 16.

Output interface 22 may comprise various types of components or devices. For example, output interface 22 may comprise a wireless transmitter, a modem, a wired networking component (e.g., an Ethernet card), or another physical component. In examples where output interface 22 comprises a wireless receiver, output interface 22 may be configured to receive data, such as the bitstream, modulated according to a cellular communication standard, such as 4G, 4G-LTE, LTE Advanced, 5G, and the like. In some examples where output interface 22 comprises a wireless receiver, output interface 22 may be configured to receive data, such as the bitstream, modulated according to other wireless standards, such as an IEEE 802.11 specification, an IEEE 802.15 specification (e.g., ZigBee™), a Bluetooth™ standard, and the like. In some examples, circuitry of output interface 22 may be integrated into circuitry of video encoder 20 and/or other components of source device 12. For example, video encoder 20 and output interface 22 may be parts of a system on a chip (SoC). The SoC may also include other components, such as a general purpose microprocessor, a graphics processing unit, and so on.

Destination device 14 may receive the encoded video data to be decoded via computer-readable medium 16. Computer-readable medium 16 may comprise any type of medium or device capable of moving the encoded video data from source device 12 to destination device 14. In some examples, computer-readable medium 16 comprises a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14. Destination device 14 may comprise one or more data storage media configured to store encoded video data and decoded video data.

In some examples, encoded data may be output from output interface 22 to a storage device. Similarly, encoded data may be accessed from the storage device by input interface 26. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and may provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 26 of destination device 14 receives information from computer-readable medium 16. The information of computer-readable medium 16 may include syntax information defined by video encoder 20 of video encoder 20, which is also used by video decoder 30, that includes syntax elements that describe characteristics and/or processing of blocks and other coded units, e.g., groups of pictures (GOPs). Input interface 26 may comprise various types of components or devices. For example, input interface 26 may comprise a wireless receiver, a modem, a wired networking component (e.g., an Ethernet card), or another physical component. In examples where input interface 26 comprises a wireless receiver, input interface 26 may be configured to receive data, such as the bitstream, modulated according to a cellular communication standard, such as 4G, 4G-LTE, LTE Advanced, 5G, and the like. In some examples where input interface 26 comprises a wireless receiver, input interface 26 may be configured to receive data, such as the bitstream, modulated according to other wireless standards, such as an IEEE 802.11 specification, an IEEE 802.15 specification (e.g., ZigBee™), a Bluetooth™ standard, and the like. In some examples, circuitry of input interface 26 may be integrated into circuitry of video decoder 30 and/or other components of destination device 14. For example, video decoder 30 and input interface 26 may be parts of a SoC. The SoC may also include other components, such as a general purpose microprocessor, a graphics processing unit, and so on.

Storage media 28 may be configured to store encoded video data, such as encoded video data (e.g., a bitstream) received by input interface 26. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In some examples, video encoder 20 and video decoder 30 may operate according to a video coding standard such as an existing or future standard. Example video coding standards include, but are not limited to, ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-View Video Coding (MVC) extensions. In addition, a new video coding standard, namely HEVC or ITU-T H.265, including its range and screen content coding extensions, 3D video coding (3D-HEVC) and multiview extensions (MV-HEVC) and scalable extension (SHVC), has been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). Ye-Kui Wang et al., "High Efficiency Video Coding (HEVC) Defect Report," Joint Collaborative Team on Video Coding (JCT-VC) of ITU-T SG 16 WP 3 and ISO/IEC JTC 1/SC 29/WG 11, 14$^{th}$ Meeting, Vienna, AT, 25 Jul.-2 Aug. 2013, document JCTVC-N1003 v1, is a draft HEVC specification.

ITU-T VCEG (Q6/16) and ISO/IEC MPEG (JTC 1/SC 29/WG 11) are now studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. The JVET first met during 19-21 Oct. 2015. Jianle Chen et al., "Algorithm Description of Joint Exploration Test Model 3," Joint Video Exploration Team (JVET) of ITU-T SG 16 WP 3 and ISO/IEC JTC 1/SC 29/WG 11, 3rd Meeting, Geneva, CH, 26 May-1 Jun. 2016, document JVET-C1001, is an algorithm description of Joint Exploration Test Model 3 (JEM3).

In HEVC and other video coding specifications, video data includes a series of pictures. Pictures may also be referred to as "frames." A picture may include one or more sample arrays. Each respective sample array of a picture may comprise an array of samples for a respective color component. In HEVC and other video coding specifications, a picture may include three sample arrays, denoted SL, Scb, and Scr. SL is a two-dimensional array (i.e., a block) of luma samples. Scb is a two-dimensional array of Cb chroma samples. Scr is a two-dimensional array of Cr chroma samples. In other instances, a picture may be monochrome and may only include an array of luma samples.

As part of encoding video data, video encoder 20 may encode pictures of the video data. In other words, video encoder 20 may generate encoded representations of the pictures of the video data. An encoded representation of a picture may be referred to herein as a "coded picture" or an "encoded picture."

To generate an encoded representation of a picture, video encoder 20 may encode blocks of the picture. Video encoder 20 may include, in a bitstream, an encoded representation of the video block. For example, to generate an encoded representation of a picture, video encoder 20 may partition each sample array of the picture into coding tree blocks (CTBs) and encode the CTBs. A CTB may be an N×N block of samples in a sample array of a picture. In the HEVC main profile, the size of a CTB can range from 16×16 to 64×64, although technically 8×8 CTB sizes can be supported.

A coding tree unit (CTU) of a picture may comprise one or more CTBs and may comprise syntax structures used to encode the samples of the one or more CTBs. For instance, each a CTU may comprise a CTB of luma samples, two corresponding CTBs of chroma samples, and syntax structures used to encode the samples of the CTBs. In monochrome pictures or pictures having three separate color planes, a CTU may comprise a single CTB and syntax structures used to encode the samples of the CTB. A CTU may also be referred to as a "tree block" or a "largest coding unit" (LCU). In this disclosure, a "syntax structure" may be defined as zero or more syntax elements present together in a bitstream in a specified order. In some codecs, an encoded picture is an encoded representation containing all CTUs of the picture.

To encode a CTU of a picture, video encoder 20 may partition the CTBs of the CTU into one or more coding blocks. A coding block is an N×N block of samples. In some codecs, to encode a CTU of a picture, video encoder 20 may recursively perform quad-tree partitioning on the coding tree blocks of a CTU to partition the CTBs into coding blocks, hence the name "coding tree units." A coding unit (CU) may comprise one or more coding blocks and syntax structures used to encode samples of the one or more coding blocks. For example, a CU may comprise a coding block of luma samples and two corresponding coding blocks of chroma samples of a picture that has a luma sample array, a Cb sample array, and a Cr sample array, and syntax structures used to encode the samples of the coding blocks. In monochrome pictures or pictures having three separate color planes, a CU may comprise a single coding block and syntax structures used to code the samples of the coding block.

Furthermore, video encoder 20 may encode CUs of a picture of the video data. In some codecs, as part of encoding a CU, video encoder 20 may partition a coding block of the CU into one or more prediction blocks. A prediction block is a rectangular (i.e., square or non-square) block of samples on which the same prediction is applied. A prediction unit (PU) of a CU may comprise one or more prediction blocks of a CU and syntax structures used to predict the one or more prediction blocks. For example, a PU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block.

Video encoder 20 may generate a predictive block (e.g., a luma, Cb, and Cr predictive block) for a prediction block (e.g., luma, Cb, and Cr prediction block) of a CU. Video encoder 20 may use intra prediction or inter prediction to generate a predictive block. If video encoder 20 uses intra prediction to generate a predictive block, video encoder 20 may generate the predictive block based on decoded samples of the picture that includes the CU. If video encoder 20 uses inter prediction to generate a predictive block of a CU of a current picture, video encoder 20 may generate the predictive block of the CU based on decoded samples of a reference picture (i.e., a picture other than the current picture).

Video encoder 20 may generate one or more residual blocks for the CU. For instance, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the Cb residual block of a CU may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may decompose the residual blocks of a CU into one or more transform blocks. For instance, video encoder 20 may use quad-tree partitioning to decompose the residual blocks of a CU into one or more transform blocks. A transform block is a rectangular (e.g., square or non-square) block of samples on which the same transform is applied. A transform unit (TU) of a CU may comprise one or more transform blocks. For example, a TU may comprise a transform block of luma samples, two corresponding transform blocks of chroma samples, and syntax structures used to transform the transform block samples. Thus, each TU of a CU may have a luma transform block, a Cb transform block, and a Cr transform block. The luma transform block of the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms a transform block of a TU to generate a coefficient block for the TU. A coefficient block may be a two-dimensional array of transform coefficients. A transform coefficient may be a scalar quantity. In some examples, the one or more transforms convert the transform block from a pixel domain to a frequency domain. Thus, in such examples, a transform coefficient may be a scalar quantity considered to be in a frequency domain. A transform coefficient level is an integer quantity representing a value associated with a particular 2-dimensional frequency index in a decoding process prior to scaling for computation of a transform coefficient value.

In some examples, video encoder 20 skips application of the transforms to the transform block. In such examples, video encoder 20 may treat residual sample values may be treated in the same way as transform coefficients. Thus, in examples where video encoder 20 skips application of the transforms, the following discussion of transform coefficients and coefficient blocks may be applicable to transform blocks of residual samples.

After generating a coefficient block, video encoder 20 may quantize the coefficient block. Quantization generally refers to a process in which transform coefficients are quantized to possibly reduce the amount of data used to represent the transform coefficients, providing further compression. In some examples, video encoder 20 skips quantization. After video encoder 20 quantizes a coefficient block, video encoder 20 may generate syntax elements indicating the quantized transform coefficients. Video encoder 20 may entropy encode one or more of the syntax elements indicating the quantized transform coefficients. For example, video encoder 20 may perform Context-Adaptive Binary Arithmetic Coding (CABAC) on the syntax elements indicating the quantized transform coefficients. Thus, an encoded block (e.g., an encoded CU) may include the entropy encoded syntax elements indicating the quantized transform coefficients.

Video encoder 20 may output a bitstream that includes encoded video data. In other words, video encoder 20 may output a bitstream that includes an encoded representation of video data. For example, the bitstream may comprise a sequence of bits that forms a representation of encoded pictures of the video data and associated data. In some examples, a representation of a coded picture may include encoded representations of blocks.

The bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units may include a NAL unit header and encapsulates a RBSP. The NAL unit header may include a syntax element indicating a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

NAL units may encapsulate RBSPs for video parameter sets (VPSs), sequence parameter sets (SPSs), and picture parameter sets (PPSs). A VPS is a syntax structure comprising syntax elements that apply to zero or more entire coded video sequences (CVSs). An SPS is also a syntax structure comprising syntax elements that apply to zero or more entire CVSs. An SPS may include a syntax element that identifies a VPS that is active when the SPS is active. Thus, the syntax elements of a VPS may be more generally applicable than the syntax elements of an SPS. A PPS is a syntax structure comprising syntax elements that apply to zero or more coded pictures. A PPS may include a syntax element that identifies an SPS that is active when the PPS is active. A slice header of a slice may include a syntax element that indicates a PPS that is active when the slice is being coded.

Video decoder 30 may receive a bitstream generated by video encoder 20. As noted above, the bitstream may comprise an encoded representation of video data. Video decoder 30 may decode the bitstream to reconstruct pictures of the video data. As part of decoding the bitstream, video decoder 30 may parse the bitstream to obtain syntax elements from the bitstream. Video decoder 30 may reconstruct pictures of the video data based at least in part on the syntax elements obtained from the bitstream. The process to reconstruct pictures of the video data may be generally reciprocal to the process performed by video encoder 20 to encode the pictures. For instance, video decoder 30 may use inter prediction or intra prediction to generate one or more predictive blocks for each PU of the current CU may use motion vectors of PUs to determine predictive blocks for the PUs of a current CU. In addition, video decoder 30 may inverse quantize coefficient blocks of TUs of the current CU. Video decoder 30 may perform inverse transforms on the coefficient blocks to reconstruct transform blocks of the TUs of the current CU. In some examples, video decoder 30 may reconstruct the coding blocks of the current CU by adding the samples of the predictive blocks for PUs of the current CU to corresponding decoded samples of the transform blocks of the TUs of the current CU. By reconstructing the coding blocks for each CU of a picture, video decoder 30 may reconstruct the picture.

A slice of a picture may include an integer number of CTUs of the picture. The CTUs of a slice may be ordered consecutively in a scan order, such as a raster scan order. In HEVC and potentially other video coding specifications, a slice is defined as an integer number of CTUs contained in one independent slice segment and all subsequent dependent slice segments (if any) that precede the next independent slice segment (if any) within the same access unit. Furthermore, in HEVC and potentially other video coding specifications, a slice segment is defined as an integer number of coding tree units ordered consecutively in the tile scan and contained in a single NAL unit. A tile scan is a specific sequential ordering of CTBs partitioning a picture in which the CTBs are ordered consecutively in CTB raster scan in a tile, whereas tiles in a picture are ordered consecutively in a raster scan of the tiles of the picture. As defined in HEVC and potentially other codecs, a tile is a rectangular region of CTBs within a particular tile column and a particular tile row in a picture. Other definitions of tiles may apply to types of blocks other than CTBs.

As mentioned above, video encoder 20 and video decoder 30 may apply CABAC encoding and decoding to syntax elements. To apply CABAC encoding to a syntax element, video encoder 20 may binarize the syntax element to form a series of one or more bits, which are referred to as "bins." In addition, video encoder 20 may identify a coding context. The coding context may identify probabilities of coding bins having particular values. For instance, a coding context may indicate a 0.7 probability of coding a 0-valued bin and a 0.3 probability of coding a 1-valued bin. After identifying the coding context, video encoder 20 may divide an interval into a lower sub-interval and an upper sub-interval. One of the sub-intervals may be associated with the value 0 and the other sub-interval may be associated with the value 1. The widths of the sub-intervals may be proportional to the probabilities indicated for the associated values by the identified coding context. If a bin of the syntax element has the value associated with the lower sub-interval, the encoded value may be equal to the lower boundary of the lower sub-interval. If the same bin of the syntax element has the value associated with the upper sub-interval, the encoded value may be equal to the lower boundary of the upper sub-interval. To encode the next bin of the syntax element, the video encoder may repeat these steps with the interval being the sub-interval associated with the value of the encoded bit. When video encoder 20 repeats these steps for the next bin, video encoder 20 may use modified probabilities based on the probabilities indicated by the identified coding context and the actual values of bins encoded.

When video decoder 30 performs CABAC decoding on a syntax element, video decoder 30 may identify a coding context. Video decoder 30 may then divide an interval into a lower sub-interval and an upper sub-interval. One of the sub-intervals may be associated with the value 0 and the other sub-interval may be associated with the value 1. The widths of the sub-intervals may be proportional to the probabilities indicated for the associated values by the identified coding context. If the encoded value is within the lower sub-interval, video decoder 30 may decode a bin having the value associated with the lower sub-interval. If the encoded value is within the upper sub-interval, video decoder 30 may decode a bin having the value associated with the upper sub-interval. To decode a next bin of the syntax element, video decoder 30 may repeat these steps with the interval being the sub-interval that contains the encoded value. When video decoder 30 repeats these steps for the next bin, video decoder 30 may use modified probabilities based on the probabilities indicated by the identified coding context and the decoded bins. Video decoder 30 may then de-binarize the bins to recover the syntax element.

Rather than performing regular CABAC encoding on all syntax elements, video encoder 20 may encode some bins using bypass CABAC coding. Performing bypass CABAC coding on a bin may be computationally less expensive than performing regular CABAC coding on the bin. Furthermore, performing bypass CABAC coding may allow for a higher degree of parallelization and throughput. Bins encoded using bypass CABAC coding may be referred to as "bypass bins." Grouping bypass bins together may increase the throughput of video encoder 20 and video decoder 30. The bypass CABAC coding engine may be able to code several bins in a single cycle, whereas the regular CABAC coding engine may be able to code only a single bin in a cycle. The bypass CABAC coding engine may be simpler because the bypass CABAC coding engine does not select contexts and may assume a probability of 1/2 for both symbols (0 and 1). Consequently, in bypass CABAC coding, the intervals are split directly in half.

In some examples, video encoder 20 may signal motion information of a block (e.g., PU) using merge/skip mode or advanced motion vector prediction (AMVP) mode. For instance, in HEVC, there are two modes for the prediction of motion parameters, one being the merge/skip mode and the other being AMVP. Motion prediction may comprise the determination of motion information of a video unit (e.g., a PU) based on motion information of one or more other video units. The motion information of a PU may include motion vector(s) of the PU, reference index(es) of the PU, and one or more prediction direction indicators.

When video encoder 20 signals the motion information of a current PU using merge mode, video encoder 20 generates a merge candidate list. In other words, video encoder 20 may perform a motion vector predictor list construction process. The merge candidate list includes a set of merge candidates that indicate the motion information of PUs that spatially or temporally neighbor the current PU. That is, in the merge mode, a candidate list of motion parameters (e.g., reference indexes, motion vectors, etc.) is constructed where a candidate can be from spatial and temporal neighboring blocks.

Furthermore, in merge mode, video encoder 20 may select a merge candidate from the merge candidate list and may use the motion information indicated by the selected merge candidate as the motion information of the current PU. Video encoder 20 may signal the position in the merge candidate list of the selected merge candidate. For instance, video encoder 20 may signal the selected motion vector parameters by transmitting an index (i.e., a merging candidate index) that indicates a position within the candidate list of the selected merge candidate. Video decoder 30 may obtain, from the bitstream, the index into the candidate list (i.e., the merging candidate index). In addition, video decoder 30 may generate the same merge candidate list and may determine, based on the merging candidate index, the selected merge candidate. Video decoder 30 may then use the motion information of the selected merge candidate to generate predictive blocks for the current PU. That is, video decoder 30 may determine, based at least in part on the candidate list index, a selected candidate in the candidate list, wherein the selected candidate specifies the motion vector for the current PU. In this way, at the decoder side, once the index is decoded, all motion parameters of the corresponding block where the index points may be inherited by the current PU.

Skip mode is similar to merge mode. In skip mode, video encoder 20 and video decoder 30 generate and use a merge candidate list in the same way that video encoder 20 and video decoder 30 use the merge candidate list in merge mode. However, when video encoder 20 signals the motion information of a current PU using skip mode, video encoder 20 does not signal any residual data for the current PU. Accordingly, video decoder 30 may determine, without use of residual data, a prediction block for the PU based on a reference block indicated by the motion information of a selected candidate in the merge candidate list.

AMVP mode is similar to merge mode in that video encoder 20 may generate a candidate list and may select a candidate from the candidate list. However, when video encoder 20 signals the RefPicListX (where X is 0 or 1) motion information of a current PU using AMVP mode, video encoder 20 may signal a RefPicListX motion vector difference (MVD) for the current PU and a RefPicListX reference index for the current PU in addition to signaling a RefPicListX motion vector predictor (MVP) index (e.g., flag or indicator) for the current PU. The RefPicListX MVP index for the current PU may indicate the position of a selected AMVP candidate in the AMVP candidate list. The RefPicListX MVD for the current PU may indicate a difference between a RefPicListX motion vector of the current PU and a motion vector of the selected AMVP candidate. In this way, video encoder 20 may signal the RefPicListX motion information of the current PU by signaling a RefPicListX MVP index, a RefPicListX reference index value, and a RefPicListX MVD. In other words, the data in the bitstream representing the motion vector for the current PU may include data representing a reference index, an index to a candidate list, and an MVD. Thus, the chosen motion vectors may be signaled by transmitting an index into the candidate list. In addition, the reference index values and motion vector differences may also be signaled.

Furthermore, when the motion information of a current PU is signaled using AMVP mode, video decoder 30 may obtain, from the bitstream, a MVD for a current PU and a MVP flag. Video decoder 30 may generate the same AMVP candidate list and may determine, based on the MVP flag, the selected AMVP candidate. In other words, in AMVP, a candidate list of motion vector predictors for each motion hypothesis is derived based on the coded reference index. As before, this list may include motion vectors of neighboring blocks that are associated with the same reference index as well as a temporal motion vector predictor which is derived based on the motion parameters of the neighboring block of the co-located block in a temporal reference picture. Video decoder 30 may recover a motion vector of the current PU by adding the MVD to the motion vector indicated by the selected AMVP candidate. That is, video decoder 30 may determine, based on a motion vector indicated by the selected AMVP candidate and the MVD, the motion vector of the current PU. Video decoder 30 may then use the recovered motion vector or motion vectors of the current PU to generate predictive blocks for the current PU.

When a video coder (e.g., video encoder 20 or video decoder 30) generates an AMVP candidate list for a current PU, the video coder may derive one or more AMVP candidates based on the motion information of PUs (i.e., spatially-neighboring PUs) that cover locations that spatially neighbor the current PU and one or more AMVP candidates based on motion information of PUs that temporally neighbor the current PU. In this disclosure, a PU (or other type of video unit) may be said to "cover" a location if a prediction block of the PU (or other type of sample block of the video unit) includes the location. The candidate list may include motion vectors of neighboring blocks that are associated with the same reference index as well as a temporal motion vector predictor which is derived based on the motion parameters (i.e., motion information) of the neighboring block of the co-located block in a temporal reference picture. A candidate in a merge candidate list or an AMVP candidate list that is based on the motion information of a PU that temporally neighbors a current PU (i.e., a PU that is in a different time instance than the current PU) may be referred to as a TMVP. A TMVP may be used to improve the coding efficiency of HEVC and, different from other coding tools, a TMVP may need to access a motion vector of a frame in a decoded picture buffer, more specifically in a reference picture list.

As introduced above, generally to improve overall coding quality, video encoder 20 and video decoder 30 may implement one or more filters that filter reconstructed video blocks. The filters may either be in-loop, meaning the filtered images are stored as reference pictures that may be used for predicting blocks of later pictures, or the filters may be post loop filters, meaning the filtered images are displayed but not stored as reference pictures. One example of such filtering is referred to as bilateral filtering. Bilateral filtering was formerly proposed by Manduchi and Tomasi to avoid undesirable over-smoothing for pixels at the edges of blocks. See C. Tomasi and R. Manduchi, "Bilateral filtering for gray and color images," in Proc. of IEEE ICCV, Bombay, India, January 1998. The main idea of bilateral filtering is the weighting of neighboring samples takes into account the pixel values themselves to weight more of those pixels with similar luminance or chrominance values. A sample located at (i, j) is filtered using neighboring sample (k, l). The weight $\omega(i, j, k, l)$ is the weight assigned for sample (k, l) to filter the sample (i, j), and is defined as:

$$\omega(i, j, k, l) = e^{\left(-\frac{(i-k)^2+(j-l)^2}{2\sigma_d^2} - \frac{\|I(i,j)-I(k,l)\|^2}{2\sigma_r^2}\right)} \quad (1)$$

In equation (1) above, I(i, j) and I(k, l) are the intensity values of samples (i, j) and (k,l) respectively. $\sigma_d$ is the spatial parameter, and $\sigma_r$ is the range parameter. Definitions of the spatial parameter and range parameter are provided below. The filtering process with the filtered sample value denoted by $I_D(i,j)$ may be defined as:

$$I_D(i, j) = \frac{\sum_{k,l} I(k, l) * \omega(i, j, k, l)}{\sum_{k,l} \omega(i, j, k, l)} \quad (2)$$

The properties (or strength) of the bilateral filter may be controlled by these two parameters. Samples located closer to the sample to be filtered, and samples having smaller intensity difference to the sample to be filtered, may have larger weight than samples further away and with larger intensity difference.

Figure 2:
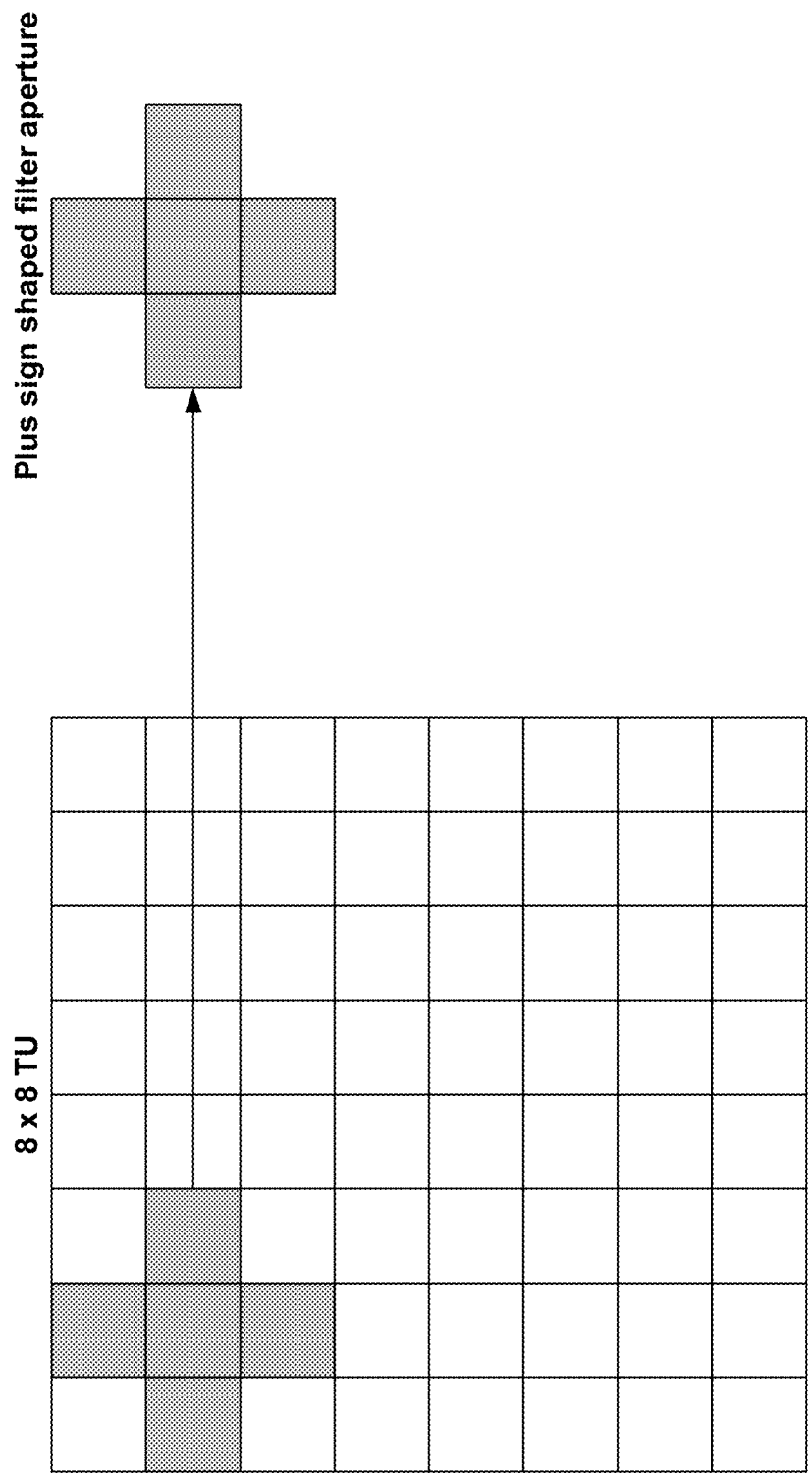
FIG. 2 is a conceptual diagram illustrating one sample and its neighboring four samples utilized in bilateral filtering process.

As described in Jacob Ström et al., "Bilateral filter after inverse transform," JVET-D0069, 4th Meeting: Chengdu, CN, 15-21 Oct. 2016 (hereinafter, "JVET-D0069"), each reconstructed sample in a transform unit (TU) is filtered using its direct neighboring reconstructed samples only. The filter has a plus sign shaped filter aperture centered at the sample to be filtered, as depicted in FIG. 2. FIG. 2 is a conceptual diagram illustrating one sample and its neighboring four samples utilized in bilateral filtering process. $\sigma_d$ to be set based on the transform unit size (3), and $\sigma_r$ to be set based on a quantization parameter (QP) used for the current block (4).

$$\sigma_d = 0.92 - \frac{\min(TU \text{ block width, } TU \text{ block height})}{40} \quad (3)$$

$$\sigma_r = \max\left(\frac{(QP-17)}{2}, 0.01\right) \quad (4)$$

The QP value may, for example, determine an amount of scaling that is applied to transform coefficient levels, which may vary an amount of compression applied to video data. The QP value may also be used in other aspects of video coding processes such as in determining the strength of a deblocking filter. The QP value may vary block by block, slice by slice, picture by picture, or with some other such frequency.

Figure 3:
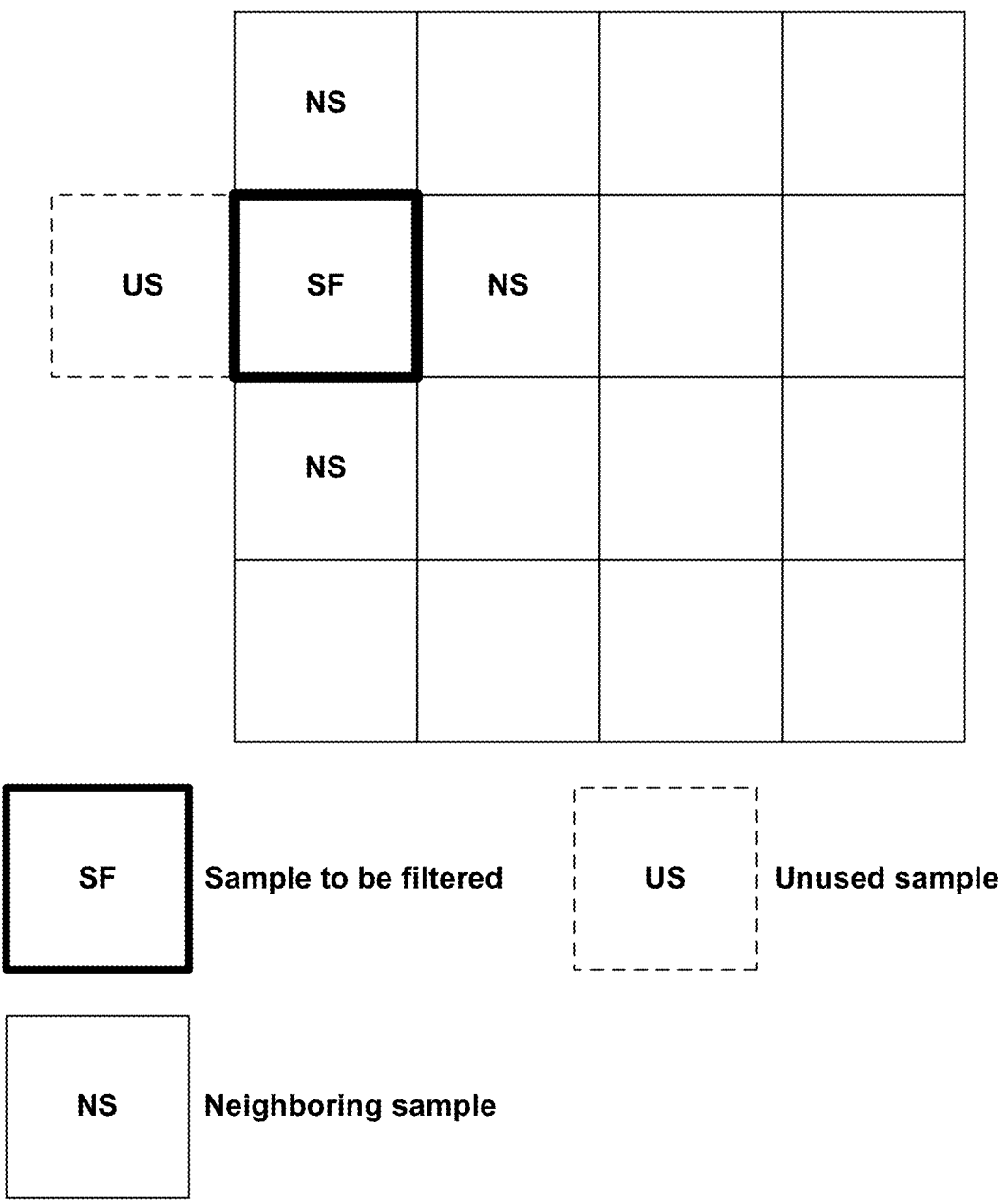
FIG. 3 is another conceptual diagram illustrating one sample and its neighboring four samples utilized in bilateral filtering process.

In some examples, bilateral filtering may only be applied to luma blocks with at least one non-zero coefficient. For chroma blocks and luma blocks with all zero coefficients, the bilateral filtering method may always be disabled. For samples of a current TU located at a TU top and left boundaries (i.e., top row and left column), only neighboring samples within the current TU are used to filter current sample. An example is given in FIG. 3. FIG. 3 is a conceptual diagram illustrating one sample and its neighboring four samples utilized in bilateral filtering process.

The design of bilateral filtering in JVET-D0069 may have the following potential issues. As an example of a first issue, when compared to other coding techniques for the same video content, the proposed techniques in JVET-D0069 may produce meaningful, e.g., non-negligible, coding gains. However, the proposed techniques in JVET-D0069 may also cause an inter-predicted block to be over-filtered due to multiple filtering processes across different frames in some coding scenarios. Although performing bilateral filtering depending on the existence of non-zero residues may alleviate this problem to some degree, performing bilateral filtering depending on the existence of non-zero residues may still cause coding performance degradation for various coding scenarios. As an example of a second issue, for some cases, a neighboring sample, such as the sample labeled US in FIG. 3, may not be considered in the filtering process, which may result in less coding efficiency. As a third example of a potential issue, block-level control of enabling/disabling bilateral filter is utilized which depends on the coded block flag (cbf) of luma component. However, for a large block, e.g., up to 128×128 in current JEM, block-level on/off control may not be accurate enough.

The following proposed techniques may address the potential issues mentioned above. Some of the following proposed techniques may be combined together. The proposed techniques may be applied to other in-loop filtering techniques which depend on certain known information to implicitly derive adaptive filter parameters, or filters with explicit signaling of parameters.

In accordance with a first technique, video encoder 20 and video decoder 30 may derive bilateral filter parameters (i.e., weights) and/or the disable bilateral filtering dependent on mode information of coded blocks. For example, weaker filters may be applied to inter-coded blocks compared to those filters applied to intra-coded blocks due to inter-coded blocks being predicted from previously coded frames which may have already been filtered. In other examples, video encoder 20 and video decoder 30 may determine contexts for signaling bilateral filter parameters dependent on mode information of coded blocks. In one example, the mode information may be defined as intra or inter coded mode. For example, video encoder 20 and video decoder 30 may determine the mode information for a current block by determining whether the current block is an intra predicted block or an inter predicted block, and then may derive the weights for use in the bilateral filter based on whether the current block is an intra predicted block or an inter predicted block. In one example, the range parameter may be dependent on the mode information. In another example, the spatial parameter may be dependent on the mode information.

In another example, the mode information may be defined as intra, inter AMVP mode (with affine motion or translational motion), inter merge mode (with affine motion or translational motion), inter skip mode, etc. Affine motion may involve rotational motion. In one example, the mode information may include the motion information, including motion vector differences (e.g., equal to zero and/or smaller than a given threshold) and/or motion vectors (e.g., equal to zero and/or smaller than a given threshold) and/or reference picture information. For example, video encoder 20 and video decoder 30 may determine the mode information for a current block by determining whether the current block is coded using an intra mode, an inter AMVP mode (with affine motion or translational motion), an inter merge mode (with affine motion or translational motion), or an inter skip mode, and then may derive the weights for use in the bilateral filter based on the current block being coded using one of an intra mode, an inter AMVP mode (with affine motion or translational motion), an inter merge mode (with affine motion or translational motion), or an inter skip mode.

In one example, the mode information for a current block may include whether a prediction block for the current block is from a long-term reference picture. In one example, the mode information may include whether a prediction block for the current block is coded with at least non-zero transform coefficient. In one example, the mode information may include the transform type and/or slice type. In HEVC, there are three slice types: I slices, P slices, and B slices. Inter prediction is disallowed in I slices, but intra prediction is allowed. Intra prediction and single directional inter prediction are allowed in P slices, but bi-directional inter prediction is disallowed. Intra prediction, single directional inter prediction and bi-directional inter prediction are all allowed in B slices. In one example, the mode information may include the low delay check flag (e.g., NoBackwardPredFlag in the HEVC specification). The syntax element NoBackwardPredFlag indicates whether all the reference pictures have smaller POC values compared to the POC value of a current picture, meaning that video decoder 30 does not need to wait for a later picture (in time order) to be decoded when decoding the current picture.

In accordance with a second technique, video encoder 20 and video decoder 30 may derive bilateral filter parameters (i.e., weights) dependent on color component (e.g., YCbCr or YCgCo). In current implementations of bilateral filtering, only luma components are bilateral filtered. According to techniques of this disclosure, however, video encoder 20 and video decoder 30 may perform bilateral filtering on chroma components as well.

In accordance with a third technique, video encoder 20 and video decoder 30 may derive different QP values for bilateral filter parameter derivation than the QP values used for an inverse quantization process. The following techniques may be conducted while deriving QP values used for bilateral filter parameter. In one example, for inter-coded blocks/blocks, a negative offset value may be added to the QP used in inverse quantization process for a block, i.e., weaker filter is utilized. In one example, for intra-coded blocks, a positive offset value or zero may be added to the QP used in inverse quantization process for a block. The differences of the two QP values used in bilateral filter parameters derivation and inverse quantization processes may be predefined. In one example, the difference may be fixed for a whole sequence, or it may be adaptively adjusted based on certain rules, such as the temporal id, and/or the Picture Order Count (POC) distance to the most recent intra slice, and/or the slice/picture-level input QP. The differences of the two QP values used in bilateral filter parameters derivation and inverse quantization processes may be signaled, such as in sequence parameter set/picture parameter set/slice header.

In accordance with a fourth technique, when block-level rate control is used wherein different blocks may select different QPs for quantization/inverse quantization process, in this case, the QP used in quantization/inverse quantization process of current block is then utilized to derive the bilateral filtering parameters. In one example, furthermore, the third technique described above may still apply wherein the difference of QPs are the difference of those used in bilateral filter parameters derivation and inverse quantization processes.

In some examples, even if different blocks may use different QPs for quantization/inverse quantization processes, the slice level QP may still be used to derive the bilateral filtering parameters. In this case, the third technique described above may still apply wherein the difference of QPs are the difference of those used in bilateral filter parameters derivation and the slice level QP.

In accordance with a fifth technique, when filtering samples at TU boundaries, especially for the top and/or left boundary, video encoder 20 and video decoder 30 may utilize neighboring samples, even if the neighboring samples are located outside a TU boundary. Video encoder 20 and video decoder 30 may, for example, utilize a neighboring sample if the neighboring sample is located in the same LCU. Video encoder 20 and video decoder 30 may, for example, utilize a neighboring sample if the neighboring sample is located in the same LCU row (not crossing LCU boundary to access above samples). Video encoder 20 and video decoder 30 may, for example, utilize a neighboring sample if the neighboring sample is located in the same slice/tile.

Video encoder 20 and video decoder 30 may, for example, utilize a neighboring sample, if a neighboring sample is not available (such as a neighboring sample that does not exist, is un-coded/un-decoded, and/or is outside of TU, LCU, slice or tile boundary), by applying a padding process to derive a virtual sample value for the corresponding sample, and use the virtual value for parameter derivation. The padding process may be defined as copying a sample value from existing samples. In this context, a virtual sample value refers to a derived value determined for a sample that is not known (e.g., not yet decoded or otherwise unavailable). The padding process may be also applicable to below/right TU boundaries.

Figure 4:
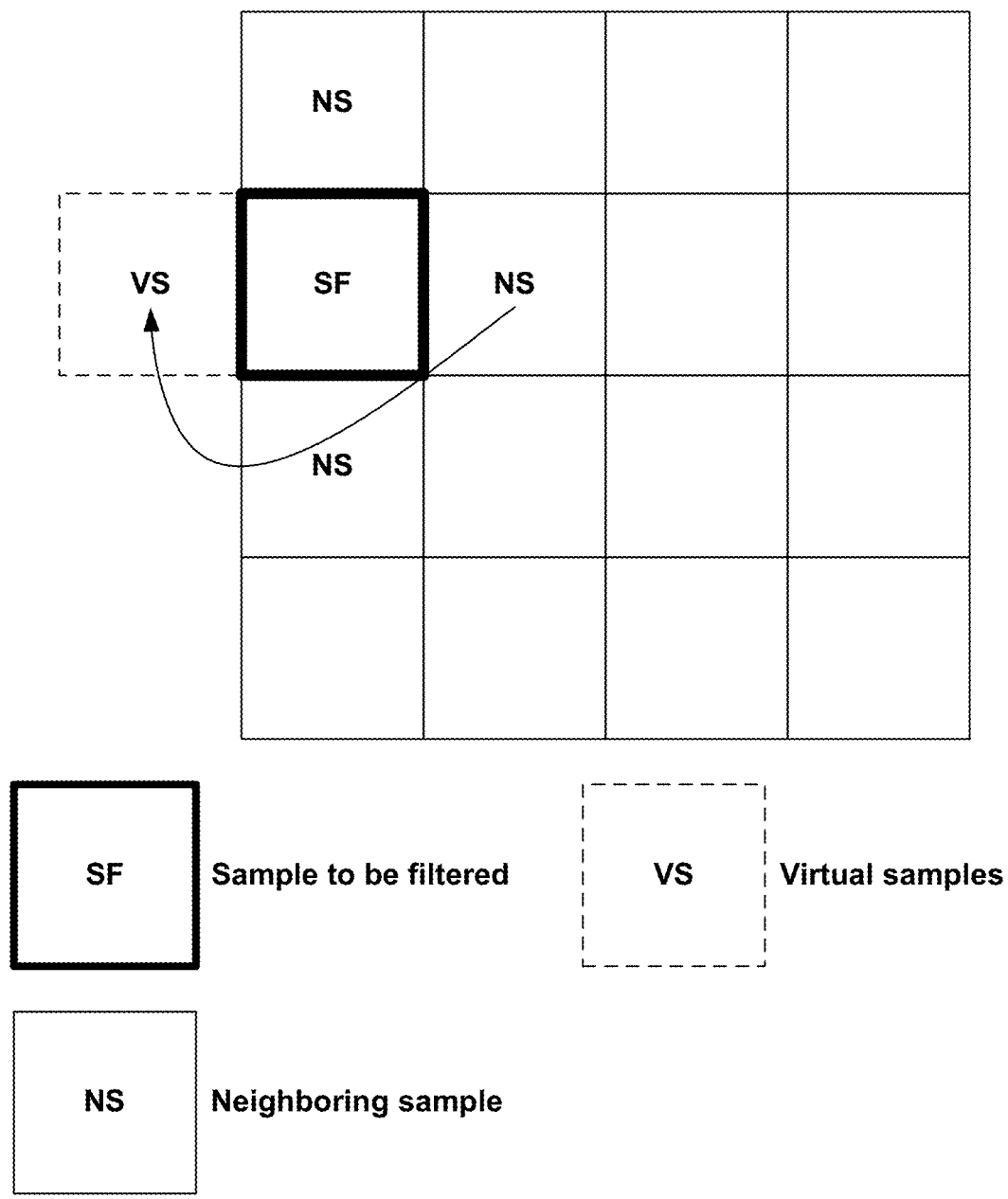
FIG. 4 is a conceptual diagram illustrating an example of padding from samples for left neighboring samples.
Figure 5:
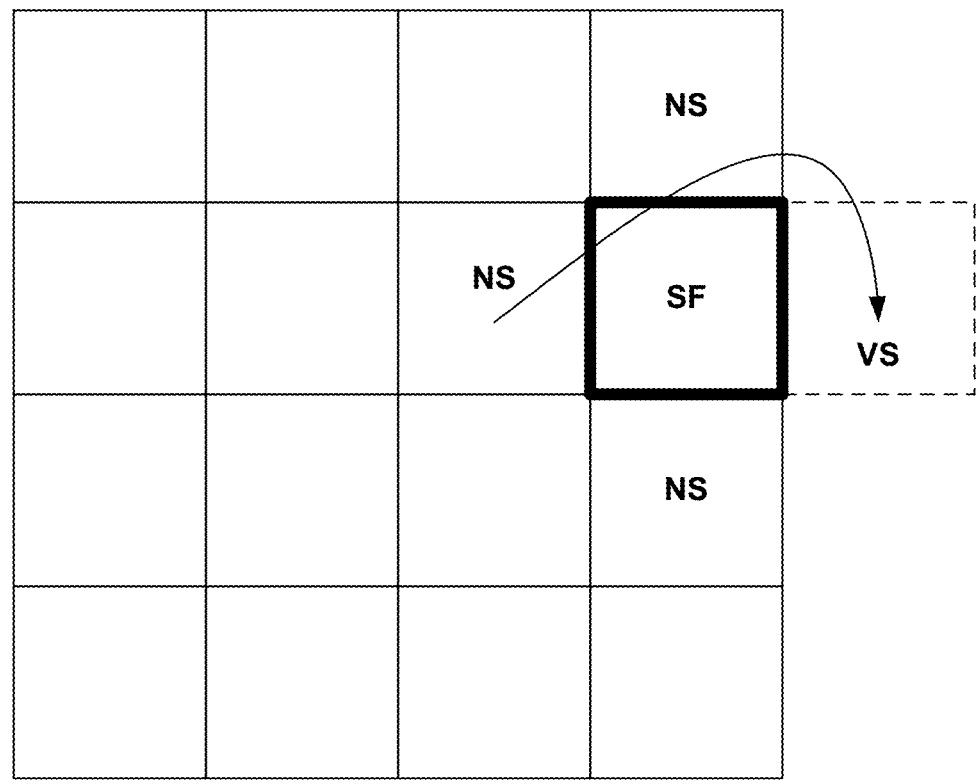
FIG. 5 is a conceptual diagram illustrating an example of padding from samples for right neighboring samples.
Figure 5:
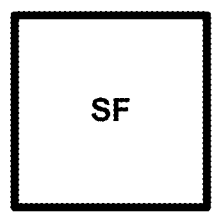
Figure 5:
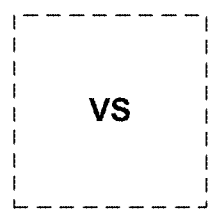
Figure 5:
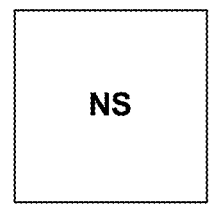

FIG. 4 and FIG. 5 show examples of the fifth technique introduced above. FIG. 4 is a conceptual diagram illustrating an example of padding from samples for left neighboring samples. FIG. 5 is a conceptual diagram illustrating an example of padding from samples for right neighboring samples. In the examples of FIGS. 4 and 5, video encoder 20 and video decoder 30 derive values for neighboring samples if those neighboring samples are unavailable. The unavailable neighboring samples with derived sample values are shown as "virtual samples" in FIGS. 4 and 5.

In accordance with a sixth technique, video encoder 20 and video decoder 30 may derive bilateral filter parameters (i.e., weights) and/or disable bilateral filtering dependent on partial or all of the information of coefficients. In other examples, video encoder 20 and video decoder 30 may determine contexts used for signaling bilateral filter parameters dependent on partial or all of the information of transform coefficients. In these examples, the transform coefficients may be defined as the transform coefficients after quantization, i.e., those transmitted in the bitstream. In some examples, the transform coefficients may be defined as the coefficients after inverse quantization.

Furthermore, in some examples of the sixth technique, the information of coefficients includes how many non-zero coefficients within a coded block or a sub-block of a coded block. For example, weaker bilateral filters may be applied to blocks with fewer non-zero coefficients. In some examples of the sixth technique, the information of coefficients includes how big the magnitudes of non-zero coefficients within a coded block or a sub-block of a coded block. For example, weaker bilateral filters may be applied to blocks with smaller magnitudes of non-zero coefficients. In some examples of the sixth technique, the information of coefficients includes how big the energy of non-zero coefficients within a coded block or a sub-block of a coded block. For example, weaker bilateral filters may be applied to blocks with lower energy. In some cases, the energy is defined as the sum of square of non-zero coefficients. In some examples of the sixth technique, the information of coefficients includes the distance of non-zero coefficients. In some examples, the distance is measured by the scan order index.

In accordance with a seventh technique of this disclosure, video encoder 20 and video decoder 30 may control the enabling/disabling of bilateral filtering at a sub-block level instead of controlling the enabling/disabling of bilateral filtering at a block-level. Furthermore, in some examples, the selection of filter strength (e.g., modification of QPs used in filtering process) may be performed in sub-block level. In one example, the above rules for checking the information of coded blocks may be replaced by checking the information of a certain sub-block.

Figure 6:
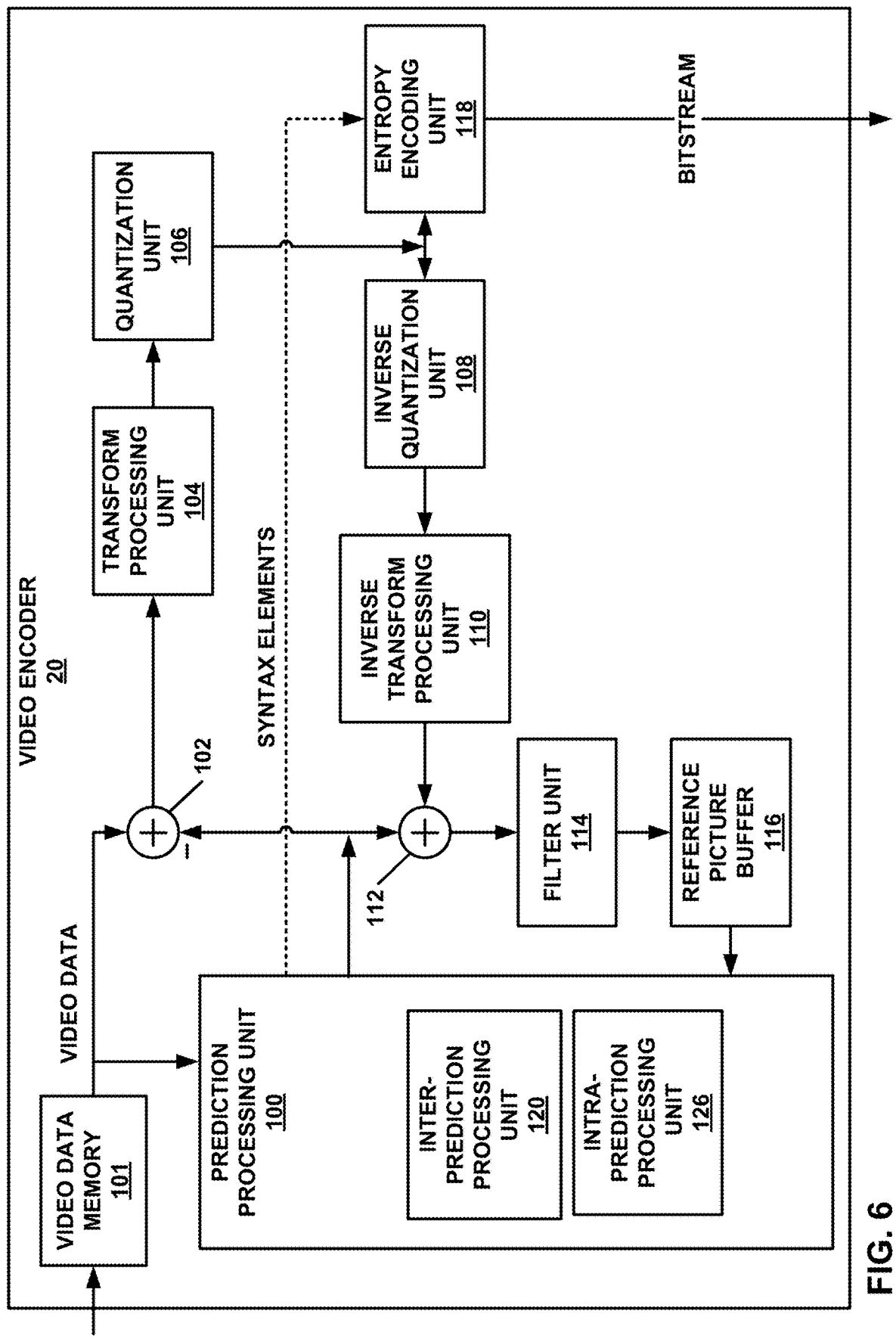
FIG. 6 is a block diagram illustrating an example video encoder that may implement one or more techniques described in this disclosure.

FIG. 6 is a block diagram illustrating an example video encoder 20 that may implement the techniques of this disclosure. FIG. 6 is provided for purposes of explanation and should not be considered limiting of the techniques as broadly exemplified and described in this disclosure. The techniques of this disclosure may be applicable to various coding standards or methods.

In the example of FIG. 6, video encoder 20 includes a prediction processing unit 100, video data memory 101, a residual generation unit 102, a transform processing unit 104, a quantization unit 106, an inverse quantization unit 108, an inverse transform processing unit 110, a reconstruction unit 112, a filter unit 114, a reference picture buffer 116, and an entropy encoding unit 118. Prediction processing unit 100 includes an inter-prediction processing unit 120 and an intra-prediction processing unit 126. Inter-prediction processing unit 120 may include a motion estimation unit and a motion compensation unit (not shown).

Video data memory 101 may be configured to store video data to be encoded by the components of video encoder 20. The video data stored in video data memory 101 may be obtained, for example, from video source 18. Reference picture buffer 116 may be a reference picture memory that stores reference video data for use in encoding video data by video encoder 20, e.g., in intra- or inter-coding modes. Video data memory 101 and reference picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 101 and reference picture buffer 116 may be provided by the same memory device or separate memory devices. In various examples, video data memory 101 may be on-chip with other components of video encoder 20, or off-chip relative to those components. Video data memory 101 may be the same as or part of storage media 19 of FIG. 1.

Video encoder 20 receives video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform partitioning to divide the CTBs of the CTU into progressively-smaller blocks. The smaller blocks may be coding blocks of CUs. For example, prediction processing unit 100 may partition a CTB associated with a CTU according to a tree structure.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU. As part of generating the predictive data for a PU, inter-prediction processing unit 120 performs inter prediction on the PU. The predictive data for the PU may include predictive blocks of the PU and motion information for the PU. Inter-prediction processing unit 120 may perform different operations for a PU of a CU depending on whether the PU is in an I slice, a P slice, or a B slice.

Intra-prediction processing unit 126 may generate predictive data for a PU by performing intra prediction on the PU. The predictive data for the PU may include predictive blocks of the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. Intra-prediction processing unit 126 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the coding blocks (e.g., luma, Cb and Cr coding blocks) for a CU and the selected predictive blocks (e.g., predictive luma, Cb and Cr blocks) for the PUs of the CU, residual blocks (e.g., luma, Cb and Cr residual blocks) for the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform partition the residual blocks of a CU into transform blocks of TUs of the CU. For instance, transform processing unit 104 may perform quad-tree partitioning to partition the residual blocks of the CU into transform blocks of TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a QP value associated with the CU. Video encoder 20 may adjust the degree of quantization applied to the coefficient blocks associated with a CU by adjusting the QP value associated with the CU. Quantization may introduce loss of information. Thus, quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Reference picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in reference picture buffer 116 to perform intra prediction on other PUs in the same picture as the CU.

Filter unit 114 may apply bilateral filtering in accordance with the techniques of this disclosure. In some examples, video encoder 20 may reconstruct a current block of a picture of the video data. For instance, reconstruction unit 112 may reconstruct the current block as described elsewhere in this disclosure. Additionally, in this example, filter unit 114 may determine, based on mode information, whether to apply bilateral filtering to samples of the current block, the bilateral filter assigning weights to neighboring samples of a current sample of the current block based on distances of the neighboring samples from the current sample and based on similarities of luminance or chrominance values of the neighboring samples to a luminance or chrominance value of the current sample. The similarity may, for example, be determined based on differences between sample values. In this example, in response to a determination to apply the bilateral filter to the samples of the current block, filter unit 114 may apply the bilateral filter to the current sample of the current block. In some instances, filter unit 114 may apply the bilateral filter in accordance with Equation (2), above. After applying the bilateral filter to the current sample, prediction processing unit 100 may use the picture as a reference picture in encoding another picture of the video data, as described elsewhere in this disclosure. For instance, prediction processing unit 100 may use the picture for inter prediction of another picture.

In some examples, filter unit 114 may derive weights for use in bilateral filtering. As described elsewhere in this disclosure, the bilateral filter may assign the weights to neighboring samples of a current sample of the current block based on mode information, based on distances of the neighboring samples from the current sample and based on similarities of luminance or chrominance values of the neighboring samples to a luminance or chrominance value of the current sample. Filter unit 114 may apply the bilateral filter to the current sample of the current block. In some instances, filter unit 114 may apply the bilateral filter in accordance with Equation (2), above. After applying the bilateral filter to the current sample, prediction processing unit 100 may use the picture as a reference picture in encoding another picture of the video data, as described elsewhere in this disclosure.

In some examples, video encoder 20 may reconstruct a current block of a picture of the video data, as described elsewhere. Furthermore, in this example, entropy encoding unit 118 may determine, based on mode information, coding contexts to use for entropy decoding a parameter for bilateral filtering. For example, the contexts used for coding bilateral filter parameters for intra-coded blocks may be different from those used for coding bilateral filter parameters for inter-coded blocks. In another example, the coding methods for coding bilateral filter parameters for intra-coded and inter-coded blocks may be different. The bilateral filter may assign greater weight to neighboring samples of a current sample of the current block that have luminance or chrominance values similar to a luminance or chrominance value of the current sample. Additionally, entropy encoding unit 118 may use the determined coding context to entropy encode the parameter. In this example, filter unit 114 may apply the bilateral filter to the current sample of the current block based on the parameter. After applying the bilateral filter to the current sample, prediction processing unit 100 may use the picture as a reference picture in encoding another picture of the video data, as described elsewhere in this disclosure.

In some examples, filter unit 114 may derive weights for use in bilateral filtering. In this example, the bilateral filter may assign the weights to neighboring samples of a current sample of the current block based on a color component to which the bilateral filter is to be applied, based on distances of the neighboring samples from the current sample and based on similarities of luminance or chrominance values of the neighboring samples to a luminance or chrominance value of the current sample. For instance, for different color components (e.g., luma, Cb, Cr), but the sample distances and similarities, filter unit 160 may assign different weights. Filter unit 114 may apply the bilateral filter to the current sample of the current block. After applying the bilateral filter to the current sample, prediction processing unit 100 may use the picture as a reference picture in encoding another picture of the video data, as described elsewhere in this disclosure.

In some examples, filter unit 114 may derive weights for use in bilateral filtering. In this example, the bilateral filter may assign the weights to neighboring samples of a current sample of the current block based on information regarding coefficients. After reconstructing the current block, filter unit 114 may apply the bilateral filter to the current sample of the current block. After applying the bilateral filter to the current sample, prediction processing unit 100 may use the picture as a reference picture in encoding another picture of the video data.

In some examples, filter unit 114 may determine whether to apply bilateral filtering to samples of a sub-block of the current block. In response to a determination to apply the bilateral filter to the samples of the sub-block, filter unit 114 may apply the bilateral filter to a current sample of the sub-block. After applying the bilateral filter to the current sample, prediction processing unit 100 may use the picture as a reference picture in encoding another picture of the video data.

In some examples, inverse quantization unit 108 may inverse quantize data (e.g., transform coefficients, residual data) of a block of picture of the video data according to a first QP value. Reconstruction unit 112 may reconstruct the block based on the inverse quantized data of the block (e.g., after application of an inverse transform to the inverse quantized data). Furthermore, in this example, inverse quantization unit 108 may determine a range parameter based on a second, different QP value. For instance, in Equation (4), above, the QP value used in determining the range parameter may be the second QP value, not the QP value used in the inverse quantization. Additionally, filter unit 114 may apply bilateral filtering to a current sample of the block. The bilateral filter may assign the weights to neighboring samples of the current sample based on the second QP value, based on distances of the neighboring samples from the current sample and based on similarities of luminance or chrominance values of the neighboring samples to a luminance or chrominance value of the current sample. After applying the bilateral filter to the current sample, prediction processing unit 100 may use the picture as a reference picture in encoding another picture of the video data, as described elsewhere in this disclosure.

In some examples, quantization unit 106 and inverse quantization unit 108 may use block-level rate control. Thus, for each respective block of a plurality of blocks of a picture of the video data (which may or may not include all block of the picture), quantization unit 106 and/or inverse quantization unit 108 may determine a QP value for the respective block. Different QP values may be determined for at least two blocks of the plurality of blocks. Inverse quantization unit 108 may inverse quantize data of the respective block according to the QP value for the respective block. Additionally, in this example, filter unit 114 may determine a range parameter based on the QP value for the respective block. For instance, filter unit 114 may determine the range parameter using the QP value for the respective block in accordance with Equation (4), above. Filter unit 114 may apply bilateral filtering to a current sample of the respective block. The bilateral filter may assign the weights to neighboring samples of the current sample based on the QP value for the respective block, based on distances of the neighboring samples from the current sample and based on similarities of luminance or chrominance values of the neighboring samples to a luminance or chrominance value of the current sample. In this example, after applying the bilateral filter to the current sample, prediction processing unit 100 may use the picture as a reference picture in encoding another picture of the video data, as described elsewhere in this disclosure.

In some examples, reconstruction unit 112 of video encoder 20 may reconstruct a current block of a picture of the video data. Additionally, in this example, filter unit 114 may apply bilateral filtering to samples of the current block. The bilateral filter may assign weights to neighboring samples of a current sample of the current block based on distances of the neighboring samples from the current sample and based on similarities of luminance or chrominance values of the neighboring samples to a luminance or chrominance value of the current sample. As part of applying the bilateral filter, filter unit 114 may determine whether a neighboring sample of the current sample is unavailable. In response to determining that the neighboring sample of the current sample is unavailable, filter unit 114 may derive a virtual sample value for the neighboring sample. Additionally, filter unit 114 may determine a filtered value of the current sample based on the virtual sample value. For instance, filter unit 114 may use equation (2) to determine the filtered value. After applying the bilateral filter to the current sample, prediction processing unit 100 may use the picture as a reference picture in encoding another picture of the video data, as described elsewhere in this disclosure.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a CABAC operation, a context-adaptive variable length coding (CAVLC) operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents values of transform coefficients for a CU.

According to one example of this disclosure, video encoder 20 may be configured to reconstruct a current block of a picture of the video data; determine, based on mode information, whether to apply bilateral filtering to samples of the current block; in response to a determination to apply the bilateral filter to the samples of the current block, apply the bilateral filter to a current sample of the current block; and after applying the bilateral filter to the current sample, use the picture as a reference picture in encoding another picture of the video data.

According to another example of this disclosure, video encoder 20 may be configured to reconstruct a current block of a picture of the video data; derive weights for use in bilateral filtering, the bilateral filter assigning the weights to neighboring samples of a current sample of the current block based on mode information; after reconstructing the current block, apply the bilateral filter to the current sample of the current block; and after applying the bilateral filter to the current sample, use the picture as a reference picture in encoding another picture of the video data.

According to another example of this disclosure, video encoder 20 may be configured to reconstruct a current block of a picture of the video data; determine, based on mode information, a coding context to use for entropy decoding a parameter for bilateral filtering; use the determined coding context to entropy encode the parameter; apply the bilateral filter to a current sample of the current block based on the parameter; and after applying the bilateral filter to the current sample, use the picture as a reference picture in encoding another picture of the video data.

In the examples above, the mode information may be whether the current block is coded using an intra or inter coded mode. In other instances, the mode information may be whether the current block is coded using an intra mode, inter AMVP mode with affine motion or translation motion, or an inter skip mode. The mode information may also include motion information or information indicating whether a prediction block corresponding to the current block is from a long term reference picture. The mode information may also include information indicating whether a prediction block corresponding to the current block has at least one non-zero transform coefficient, a transform type, or a low delay check flag.

According to one example of this disclosure, video encoder 20 may be configured to reconstruct a current block of a picture of the video data; derive weights for use in bilateral filtering, the bilateral filter assigning the weights to neighboring samples of a current sample of the current block based on a color component to which the bilateral filter is to be applied; apply the bilateral filter to the current sample of the current block; and after applying the bilateral filter to the current sample, use the picture as a reference picture in encoding another picture of the video data.

According to one example of this disclosure, video encoder 20 may be configured to inverse quantize data of a block of picture of the video data according to a first QP value; reconstruct the block based on the inverse quantized data of the block; determine a range parameter based on a second, different QP value; apply bilateral filtering to a current sample of the block, the bilateral filter assigning the weights to neighboring samples of the current sample based on the second QP value; and after applying the bilateral filter to the current sample, use the picture as a reference picture in encoding another picture of the video data.

In some examples, based on the block being an inter-coded block, encoder 20 may determine the second QP value such that the second QP value is equal to the first QP value plus a negative offset value. In other examples, based on the block being an intra-coded block, video encoder 20 may determine the second QP value such that the second QP value is equal to the first QP value plus a positive offset value. A difference between the first QP value and the second QP value may be predefined.

In some examples, video encoder 20 may obtain, from the bitstream, an indication of a difference between the first QP value and the second QP value. In some examples, to determine the range parameter based on the second QP value, video encoder 20 may determine that the second QP value is the greater of a first value and a second value, the first value being equal to the second QP value —17 divided by 2, with the second value being a predefined fixed value.

In some examples, the block is a first block, and video encoder 20 is further configured to, for each respective block of a plurality of blocks of the picture, select a QP value for the respective block. Different QP values may be determined for at least two blocks of the plurality of blocks that includes the first block. The second QP value may be a slice-level QP value for a slice that includes the first block.

In some examples, the block may be a first block, and video encoder 20 may be configured to, for each respective block of a plurality of blocks of the picture, select QP value for the respective block. Different QP values may be determined for at least two blocks of the plurality of blocks that include the first block. There may be a predefined fixed difference between the second QP value and a slice-level QP value for a slice that includes the first block.

Video encoder 20 may be further configured to include, in a bitstream that includes an encoded representation of the picture, an indication of a difference between the first QP value and the second QP value.

According to one example of this disclosure, video encoder 20 may be configured to, for each respective block of a plurality of blocks of a picture of the video data, determine a QP value for the respective block, wherein different QP values are determined for at least two blocks of the plurality of blocks; inverse quantize data of the respective block according to the QP value for the respective block; determine a range parameter based on the QP value for the respective block; apply bilateral filtering to a current sample of the respective block, the bilateral filter assigning the weights to neighboring samples of the current sample based on the QP value for the respective block; and after applying the bilateral filter to the current sample, use the picture as a reference picture in encoding another picture of the video data.

To determine the range parameter based on the QP value for the respective block, video encoder 20 may be configured to determine, based on the QP value for the respective block, a second QP value different from the QP value for the respective block and determine the range parameter based on the second QP value.

According to one example of this disclosure, video encoder 20 may be configured to reconstruct a current block of a picture of the video data and apply bilateral filtering to samples of the current block. To apply the bilateral filter comprises, video encoder 20 may be configured to determine whether a neighboring sample of a current sample of the current block is unavailable; in response to determining that the neighboring sample of the current sample is unavailable, derive a virtual sample value for the neighboring sample; and determine a filtered value of the current sample based on the virtual sample value; and after apply the bilateral filter to the current sample, using the picture as a reference picture in encoding another picture of the video data.

According to one example of this disclosure, video encoder 20 may be configured to reconstruct a current block of a picture of the video data; derive weights for use in bilateral filtering, the bilateral filter assigning the weights to neighboring samples of a current sample of the current block based on information regarding coefficients; after reconstructing the current block, apply the bilateral filter to the current sample of the current block; and after applying the bilateral filter to the current sample, use the picture as a reference picture in encoding another picture of the video data.

The neighboring sample may be determined to be available when at least one of: the neighboring sample is in the same Largest Coding Unit (LCU) as the current sample, the neighboring sample is in a same LCU as the current sample, or the neighboring sample is in the same slice or tile as the current sample. To derive the virtual sample value, video encoder 20 may set the virtual sample value equal to a value of another sample that neighbors the current sample.

The coefficients may be coefficients after quantization or coefficients after inverse quantization. The information regarding the coefficients may include how many non-zero coefficients within a coded block or a sub-block of the coded block. The information regarding the coefficients may include information regarding magnitudes of non-zero coefficients within a coded block or a sub-block of the coded block. The information regarding the coefficients may include information regarding energy levels of non-zero coefficients within a coded block or a sub-block of the coded block. The information regarding the coefficients may include a distance of non-zero coefficients.

According to one example of this disclosure, video encoder 20 may be configured to reconstruct a current block of a picture of the video data; determine whether to apply bilateral filtering to samples of a sub-block of the current block; in response to a determination to apply the bilateral filter to the samples of the sub-block, apply the bilateral filter to a current sample of the sub-block; and after applying the bilateral filter to the current sample, use the picture as a reference picture in encoding another picture of the video data.

Video encoder 20 may be further configured to select, at a sub-block level, a filter strength of the bilateral filter applied to the current sample of the sub-block. To determine whether to apply the bilateral filter to the samples of the sub-block, video encoder 20 may determine, based on mode information, whether to apply the bilateral filter to the samples of the sub-block. The mode information may include any of, or combination or permutation of, an intra or inter coded mode, and inter AMVP mode with affine motion or translation motion, an inter skip mode, motion information, information indicating whether a prediction block corresponding to the current block is from a long term reference picture, information indicating whether a prediction block corresponding to the current block has at least one non-zero transform coefficient, a transform type, or a low delay check flag.

For any of the examples above, the bilateral filtering process may include assigning weights to neighboring samples of a current sample of the current block based on distances of the neighboring samples from the current sample and based on similarities of luminance or chrominance values of the neighboring samples to a luminance or chrominance value of the current sample.

Figure 7:
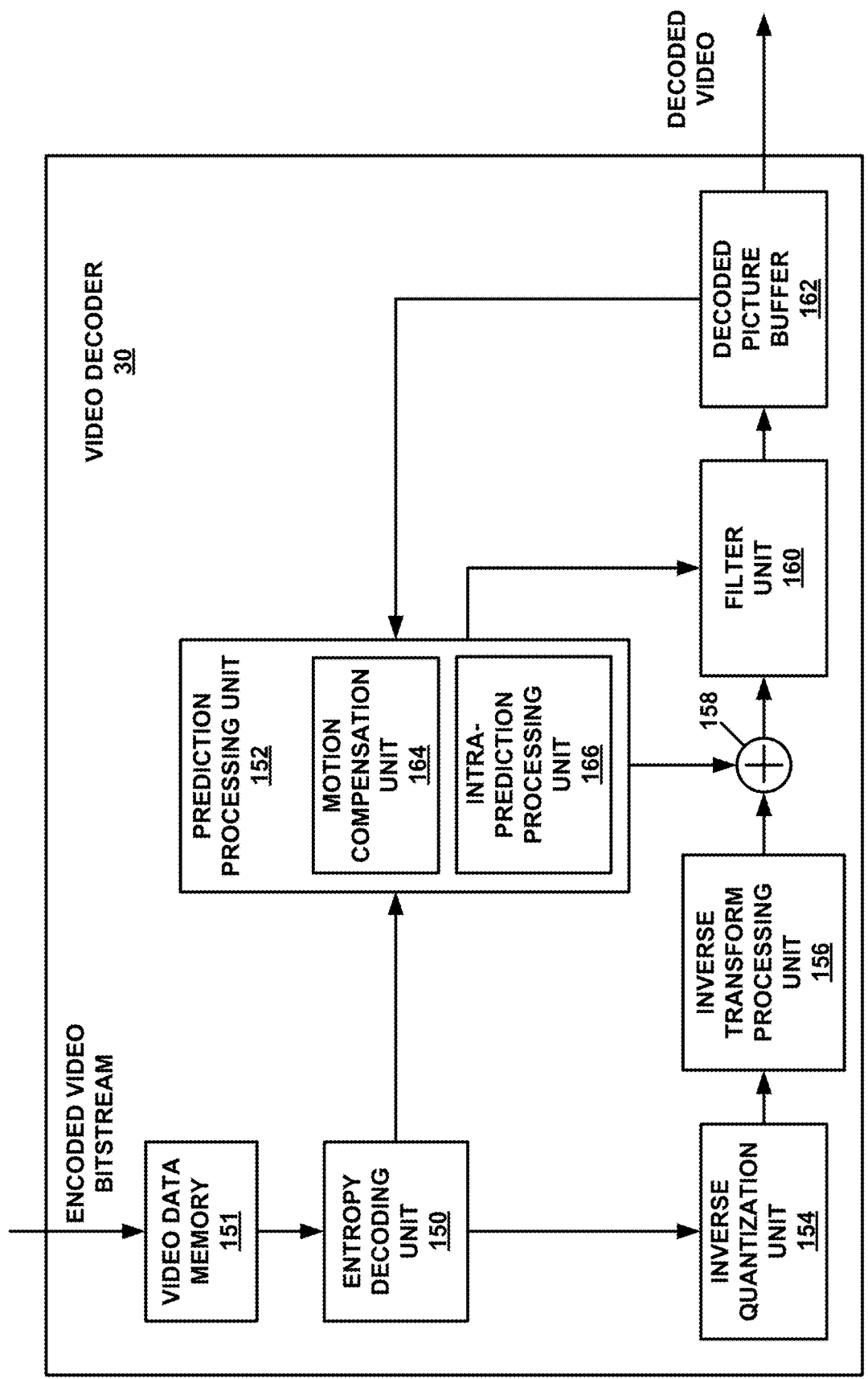
FIG. 7 is a block diagram illustrating an example video decoder that may implement one or more techniques described in this disclosure.

FIG. 7 is a block diagram illustrating an example video decoder 30 that is configured to implement the techniques of this disclosure. FIG. 7 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 7, video decoder 30 includes an entropy decoding unit 150, video data memory 151, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

Video data memory 151 may store encoded video data, such as an encoded video bitstream, to be decoded by the components of video decoder 30. The video data stored in video data memory 151 may be obtained, for example, from computer-readable medium 16, e.g., from a local video source, such as a camera, via wired or wireless network communication of video data, or by accessing physical data storage media. Video data memory 151 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-coding modes, or for output. Video data memory 151 and decoded picture buffer 162 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 151 and decoded picture buffer 162 may be provided by the same memory device or separate memory devices. In various examples, video data memory 151 may be on-chip with other components of video decoder 30, or off-chip relative to those components. Video data memory 151 may be the same as or part of storage media 28 of FIG. 1.

Video data memory 151 receives and stores encoded video data (e.g., NAL units) of a bitstream. Entropy decoding unit 150 may receive encoded video data (e.g., NAL units) from video data memory 151 and may parse the NAL units to obtain syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream. Entropy decoding unit 150 may perform a process generally reciprocal to that of entropy encoding unit 118.

In addition to obtaining syntax elements from the bitstream, video decoder 30 may perform a reconstruction operation on a non-partitioned CU. To perform the reconstruction operation on a CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

Inverse quantization unit 154 may perform particular techniques of this disclosure. For example, for at least one respective quantization group of a plurality of quantization groups within a CTB of a CTU of a picture of the video data, inverse quantization unit 154 may derive, based at least in part on local quantization information signaled in the bitstream, a respective quantization parameter for the respective quantization group. Additionally, in this example, inverse quantization unit 154 may inverse quantize, based on the respective quantization parameter for the respective quantization group, at least one transform coefficient of a transform block of a TU of a CU of the CTU. In this example, the respective quantization group is defined as a group of successive, in coding order, CUs or coding blocks so that boundaries of the respective quantization group must be boundaries of the CUs or coding blocks and a size of the respective quantization group is greater than or equal to a threshold. Video decoder 30 (e.g., inverse transform processing unit 156, reconstruction unit 158, and filter unit 160) may reconstruct, based on inverse quantized transform coefficients of the transform block, a coding block of the CU.

If a PU is encoded using intra prediction, intra-prediction processing unit 166 may perform intra prediction to generate predictive blocks of the PU. Intra-prediction processing unit 166 may use an intra prediction mode to generate the predictive blocks of the PU based on samples spatially-neighboring blocks. Intra-prediction processing unit 166 may determine the intra prediction mode for the PU based on one or more syntax elements obtained from the bitstream.

If a PU is encoded using inter prediction, entropy decoding unit 150 may determine motion information for the PU. Motion compensation unit 164 may determine, based on the motion information of the PU, one or more reference blocks. Motion compensation unit 164 may generate, based on the one or more reference blocks, predictive blocks (e.g., predictive luma, Cb and Cr blocks) for the PU.

Reconstruction unit 158 may use transform blocks (e.g., luma, Cb and Cr transform blocks) for TUs of a CU and the predictive blocks (e.g., luma, Cb and Cr blocks) of the PUs of the CU, i.e., either intra-prediction data or inter-prediction data, as applicable, to reconstruct the coding blocks (e.g., luma, Cb and Cr coding blocks) for the CU. For example, reconstruction unit 158 may add samples of the transform blocks (e.g., luma, Cb and Cr transform blocks) to corresponding samples of the predictive blocks (e.g., luma, Cb and Cr predictive blocks) to reconstruct the coding blocks (e.g., luma, Cb and Cr coding blocks) of the CU.

Filter unit 160 may perform a deblocking operation to reduce blocking artifacts associated with the coding blocks of the CU. Video decoder 30 may store the coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the blocks in decoded picture buffer 162, intra prediction or inter prediction operations for PUs of other CUs.

Filter unit 160 may apply bilateral filtering in accordance with the techniques of this disclosure.

For example, video decoder 30 may reconstruct, based on a bitstream that includes an encoded representation of a picture of the video data, a current block of the picture. For instance, entropy decoding unit 150, inverse quantization unit 154, inverse transform processing unit 156 may determine residual samples and prediction processing unit 152 may predictive samples based on the bitstream as described elsewhere in this disclosure. Furthermore, in this example, filter unit 160 may derive weights for use in bilateral filtering. The bilateral filter may assign the weights to neighboring samples of a current sample of the current block based on mode information, based on distances of the neighboring samples from the current sample and based on similarities of luminance or chrominance values of the neighboring samples to a luminance or chrominance value of the current sample. In some examples, the weights may be determined according to Equation (1), above. After reconstructing the current block, filter unit 160 may apply the bilateral filter to the current sample of the current block. In some examples, filter unit 160 may apply the bilateral filter in accordance with Equation (2), above.

In some examples, video decoder 30 may reconstruct, based on a bitstream that includes an encoded representation of a picture of the video data, a current block of the picture. For instance, entropy decoding unit 150, inverse quantization unit 154, inverse transform processing unit 156 may determine residual samples and prediction processing unit 152 may predictive samples based on the bitstream as described elsewhere in this disclosure. Furthermore, in this example, filter unit 160 may determine, based on mode information, whether to apply bilateral filtering to samples of the current block. The bilateral filter may assign weights to neighboring samples of a current sample based of the current block on distances of the neighboring samples from the current sample and based on similarities of luminance or chrominance values of the neighboring samples to a luminance or chrominance value of the current sample. In this example, in response to a determination to apply the bilateral filter to the samples of the current block, filter unit 160 may apply the bilateral filter to the current sample of the current block. In some examples, filter unit 160 may apply the bilateral filter in accordance with Equation (2), above.

In some examples, video decoder 30 may reconstruct, based on a bitstream that includes an encoded representation of a picture of the video data, a current block of the picture. For instance, entropy decoding unit 150, inverse quantization unit 154, inverse transform processing unit 156 may determine residual samples and prediction processing unit 152 may predictive samples based on the bitstream as described elsewhere in this disclosure. Entropy decoding unit 150 may determine, based on mode information, a coding context to use for entropy decoding a parameter for bilateral filtering, the bilateral filter assigning greater weight to neighboring samples of a current sample of the current block that have luminance or chrominance values similar to a luminance or chrominance value of the current sample. In this example, entropy decoding unit 150 may use the determined coding context to entropy decode the parameter. Filter unit 160 may apply the bilateral filter to the current sample of the current block based on the parameter. In this example, the parameter may be the spatial parameter or the range parameter as described elsewhere in this disclosure.

In some examples, filter unit 160 may derive weights for use in bilateral filtering. In this example, the bilateral filter may assign the weights to neighboring samples of a current sample of the current block based on a color component to which the bilateral filter is to be applied, based on distances of the neighboring samples from the current sample and based on similarities of luminance or chrominance values of the neighboring samples to a luminance or chrominance value of the current sample. For instance, for different color components (e.g., luma, Cb, Cr), but the sample distances and similarities, filter unit 160 may assign different weights.

In some examples, video decoder 30 may reconstruct, based on a bitstream that includes an encoded representation of a picture of the video data, a current block of the picture as described elsewhere. Furthermore, filter unit 160 may derive weights for use in bilateral filtering. The bilateral filter assigning the weights to neighboring samples of a current sample of the current block based on information regarding coefficients. Furthermore, in this example, filter unit 160 may apply the bilateral filter to the current sample of the current block.

In some examples, video decoder 30 may reconstruct, based on a bitstream that includes an encoded representation of a picture of the video data, a current block of the picture, as described elsewhere in this disclosure. Furthermore, filter unit 160 may determine whether to apply bilateral filtering to samples of a sub-block of the current block. The bilateral filter assigning weights to neighboring samples of a current sample of the sub-block. In this example, in response to a determination to apply the bilateral filter to the samples of the sub-block, filter unit 160 may apply the bilateral filter to the current sample of the sub-block.

In some examples, inverse quantization unit 154 may inverse quantize data (e.g., transform coefficients, residual data) of a block of the picture according to a first QP value. Furthermore, in this example, reconstruction unit 158 may reconstruct the block based on the inverse quantized data of the block, as described elsewhere in this disclosure. Additionally, in this example, filter unit 160 may determine a range parameter based on a second, different QP value. For instance, in Equation (4), above, the QP value used in determining the range parameter may be the second QP value, not the QP value used in the inverse quantization. Furthermore, in this example, filter unit 160 may apply bilateral filtering to a current sample of the block. The bilateral filter may assign the weights to neighboring samples of the current sample based on the second QP value, based on distances of the neighboring samples from the current sample and based on similarities of luminance or chrominance values of the neighboring samples to a luminance or chrominance value of the current sample.

In some examples, video decoder 30 may receive a bitstream that comprises an encoded representation of a picture of the video data. In this example, video decoder 30 may use block-level rate control. Thus, for each respective block of a plurality of blocks of the picture (which may or may not include all blocks of the picture), inverse quantization unit 154 may determining a QP value for the respective block. Different QP values may be determined for at least two blocks of the plurality of blocks. Inverse quantization unit 154 may inverse quantize data of the respective block according to the QP value for the respective block. Additionally, in this example, filter unit 160 may determine a range parameter based on the QP value for the respective block. For instance, filter unit 160 may determine the range parameter using the QP value for the respective block in accordance with Equation (4), above. In this example, filter unit 160 may apply bilateral filtering to a current sample of the respective block, the bilateral filter assigning the weights to neighboring samples of the current sample based on the QP value for the respective block, based on distances of the neighboring samples from the current sample and based on similarities of luminance or chrominance values of the neighboring samples to a luminance or chrominance value of the current sample.

In some examples, video decoder 30 may receive a bitstream that comprises an encoded representation of a picture of the video data. Additionally, reconstruction unit 158 may reconstruct a current block of the picture. Filter unit 160 may apply bilateral filtering to samples of the current block. The bilateral filter may assign weights to neighboring samples of a current sample of the current block based on distances of the neighboring samples from the current sample and based on similarities of luminance or chrominance values of the neighboring samples to a luminance or chrominance value of the current sample. As part of applying the bilateral filter, filter unit 160 may determine whether a neighboring sample of the current sample is unavailable. Additionally, in response to determining that the neighboring sample of the current sample is unavailable, filter unit 160 may derive a virtual sample value for the neighboring sample. Filter unit 160 may determine a filtered value of the current sample based on the virtual sample value. For instance, filter unit 160 may use equation (2) to determine the filtered value.

According to one example of this disclosure, video decoder 30 may be configured to reconstruct, based on a bitstream that includes an encoded representation of a picture of the video data, a current block of the picture and to determine, based on mode information, whether to apply bilateral filtering to samples of the current block. The bilateral filter assigns weights to neighboring samples of a current sample of the current block, and in response to a determination to apply the bilateral filter to the samples of the current block, video decoder 30 applies the bilateral filter to the current sample of the current block.

According to another example of this disclosure, video decoder 30 may be configured to reconstruct, based on a bitstream that includes an encoded representation of a picture of the video data, a current block of the picture; derive weights for use in bilateral filtering, the bilateral filter assigning the weights to neighboring samples of a current sample of the current block based on mode information; and apply the bilateral filter to the current sample of the current block.

According to another example of this disclosure, video decoder 30 may be configured to reconstruct, based on a bitstream that includes an encoded representation of a picture of the video data, a current block of the picture; determine based on mode information, a coding context to use for entropy decoding a parameter for bilateral filtering; use the determined coding context to entropy decode the parameter; and apply the bilateral filter to a current sample of the current block based on the parameter.

In the examples above, the mode information may be whether the current block is coded using an intra or inter coded mode. In other instances, the mode information may be whether the current block is coded using an intra mode, inter AMVP mode with affine motion or translation motion, or an inter skip mode. The mode information may also include motion information or information indicating whether a prediction block corresponding to the current block is from a long term reference picture. The mode information may also include information indicating whether a prediction block corresponding to the current block has at least one non-zero transform coefficient, a transform type, or a low delay check flag.

According to one example of this disclosure, video decoder 30 may be configured to reconstruct, based on a bitstream that includes an encoded representation of a picture of the video data, a current block of the picture; derive weights for use in bilateral filtering, the bilateral filter assigning the weights to neighboring samples of a current sample of the current block based on a color component to which the bilateral filter is to be applied; and apply the bilateral filter to the current sample of the current block.

According to one example of this disclosure, video decoder 30 may be configured to receive a bitstream that comprises an encoded representation of a picture of the video data; inverse quantize data of a block of the picture according to a first QP value; reconstruct the block based on the inverse quantized data of the block; determine a range parameter based on a second, different QP value; and apply bilateral filtering to a current sample of the block, the bilateral filter assigning the weights to neighboring samples of the current sample based on the second QP value.

In some examples, based on the block being an inter-coded block, video decoder 30 may determine the second QP value such that the second QP value is equal to the first QP value plus a negative offset value. In other examples, based on the block being an intra-coded block, video decoder 30 may determine the second QP value such that the second QP value is equal to the first QP value plus a positive offset value. A difference between the first QP value and the second QP value may be predefined.

In some examples, video decoder 30 may obtain, from the bitstream, an indication of a difference between the first QP value and the second QP value. In some examples, to determine the range parameter based on the second QP value, video decoder 30 may determine that the second QP value is the greater of a first value and a second value, the first value being equal to the second QP value —17 divided by 2, with the second value being a predefined fixed value.

In some examples, the block is a first block, and video decoder 30 is further configured to, for each respective block of a plurality of blocks of the picture, select a QP value for the respective block. Different QP values may be determined for at least two blocks of the plurality of blocks that includes the first block. The second QP value may be a slice-level QP value for a slice that includes the first block.

In some examples, the block may be a first block, and video decoder 30 may be configured to, for each respective block of a plurality of blocks of the picture, select QP value for the respective block. Different QP values may be determined for at least two blocks of the plurality of blocks that include the first block. There may be a predefined fixed difference between the second QP value and a slice-level QP value for a slice that includes the first block.

According to one example of this disclosure, video decoder 30 may be configured to receive a bitstream that comprises an encoded representation of a picture of the video data; for each respective block of a plurality of blocks of the picture: determine a QP value for the respective block, wherein different QP values are determined for at least two blocks of the plurality of blocks; inverse quantize data of the respective block according to the QP value for the respective block; determine a range parameter based on the QP value for the respective block; and apply bilateral filtering to a current sample of the respective block, the bilateral filter assigning the weights to neighboring samples of the current sample based on the QP value for the respective block. To determine the range parameter based on the QP value for the respective block, video decoder 30 may be configured to determine, based on the QP value for the respective block, a second QP value different from the QP value for the respective block and determine the range parameter based on the second QP value.

According to one example of this disclosure, video decoder 30 may be configured to receive a bitstream that comprises an encoded representation of a picture of the video data; reconstruct a current block of the picture; apply bilateral filtering to samples of the current block. To apply the bilateral filter, video decoder 30 may be configured to determine whether a neighboring sample of a current sample of the current block is unavailable; in response to determining that the neighboring sample of the current sample is unavailable, derive a virtual sample value for the neighboring sample; and determine a filtered value of the current sample based on the virtual sample value.

The neighboring sample may be determined to be available when at least one of: the neighboring sample is in the same Largest Coding Unit (LCU) as the current sample, the neighboring sample is in a same LCU as the current sample, or the neighboring sample is in the same slice or tile as the current sample. To derive the virtual sample value, video decoder 30 may set the virtual sample value equal to a value of another sample that neighbors the current sample.

According to one example of this disclosure, video decoder 30 may be configured to reconstruct, based on a bitstream that includes an encoded representation of a picture of the video data, a current block of the picture; derive weights for use in bilateral filtering, the bilateral filter assigning the weights to neighboring samples of a current sample of the current block based on information regarding coefficients; and apply the bilateral filter to the current sample of the current block.

The coefficients may be coefficients after quantization or coefficients after inverse quantization. The information regarding the coefficients may include how many non-zero coefficients within a coded block or a sub-block of the coded block. The information regarding the coefficients may include information regarding magnitudes of non-zero coefficients within a coded block or a sub-block of the coded block. The information regarding the coefficients may include information regarding energy levels of non-zero coefficients within a coded block or a sub-block of the coded block. The information regarding the coefficients may include a distance of non-zero coefficients.

According to one example of this disclosure, video decoder 30 may be configured to reconstruct, based on a bitstream that includes an encoded representation of a picture of the video data, a current block of the picture; determine whether to apply bilateral filtering to samples of a sub-block of the current block, the bilateral filter assigning weights to neighboring samples of a current sample of the sub-block; and in response to a determination to apply the bilateral filter to the samples of the sub-block, apply the bilateral filter to the current sample of the sub-block.

Video decoder 30 may be further configured to select, at a sub-block level, a filter strength of the bilateral filter applied to the current sample of the sub-block. To determine whether to apply the bilateral filter to the samples of the sub-block, video decoder 30 may determine, based on mode information, whether to apply the bilateral filter to the samples of the sub-block. The mode information may include any of, or combination or permutation of, an intra or inter coded mode, and inter AMVP mode with affine motion or translation motion, an inter skip mode, motion information, information indicating whether a prediction block corresponding to the current block is from a long term reference picture, information indicating whether a prediction block corresponding to the current block has at least one non-zero transform coefficient, a transform type, or a low delay check flag.

For any of the examples above, the bilateral filtering process may include assigning weights to neighboring samples of a current sample of the current block based on distances of the neighboring samples from the current sample and based on similarities of luminance or chrominance values of the neighboring samples to a luminance or chrominance value of the current sample.

Figure 8:
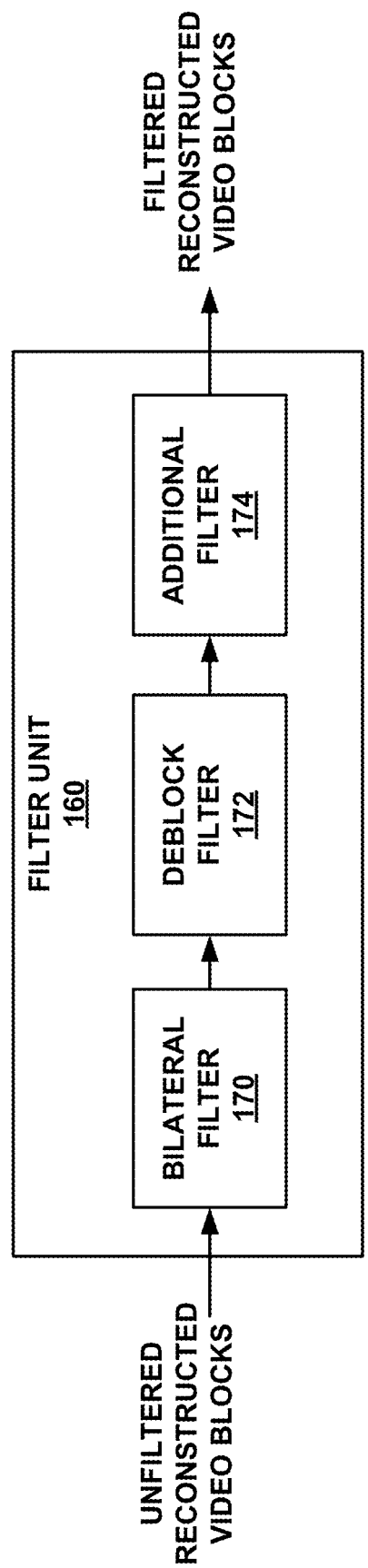
FIG. 8 shows an example implementation of a filter unit for performing the techniques of this disclosure.

FIG. 8 shows an example implementation of filter unit 160. Filter unit 114 of video encoder 20 may be implemented in the same manner. Filter units 114 and 160 may perform the techniques of this disclosure, possibly in conjunction with other components of video encoder 20 or video decoder 30. In the example of FIG. 8, filter unit 160 includes bilateral filtering 170, a deblock filter 172, and an additional filter 174. Additional filter 174 may, for example, one or more of an ALF unit, a geometry transform based ALF (GALF) unit, an SAO filter or peak SAO filter, or any other type of suitable in-loop filter.

Filter unit 160 may include fewer filters and/or may include additional filters. Additionally, the particular filters shown in FIG. 8 may be implemented in a different order. Other loop filters (either in the coding loop or after the coding loop) may also be used to smooth pixel transitions or otherwise improve the video quality. The decoded video blocks in a given frame or picture may then be stored in decoded picture buffer 162, which stores reference pictures used for motion compensation for coding blocks of subsequent pictures. Decoded picture buffer 162 may be part of or separate from additional memory that stores decoded video for later presentation on a display device, such as display device 32 of FIG. 1.

Figure 9:
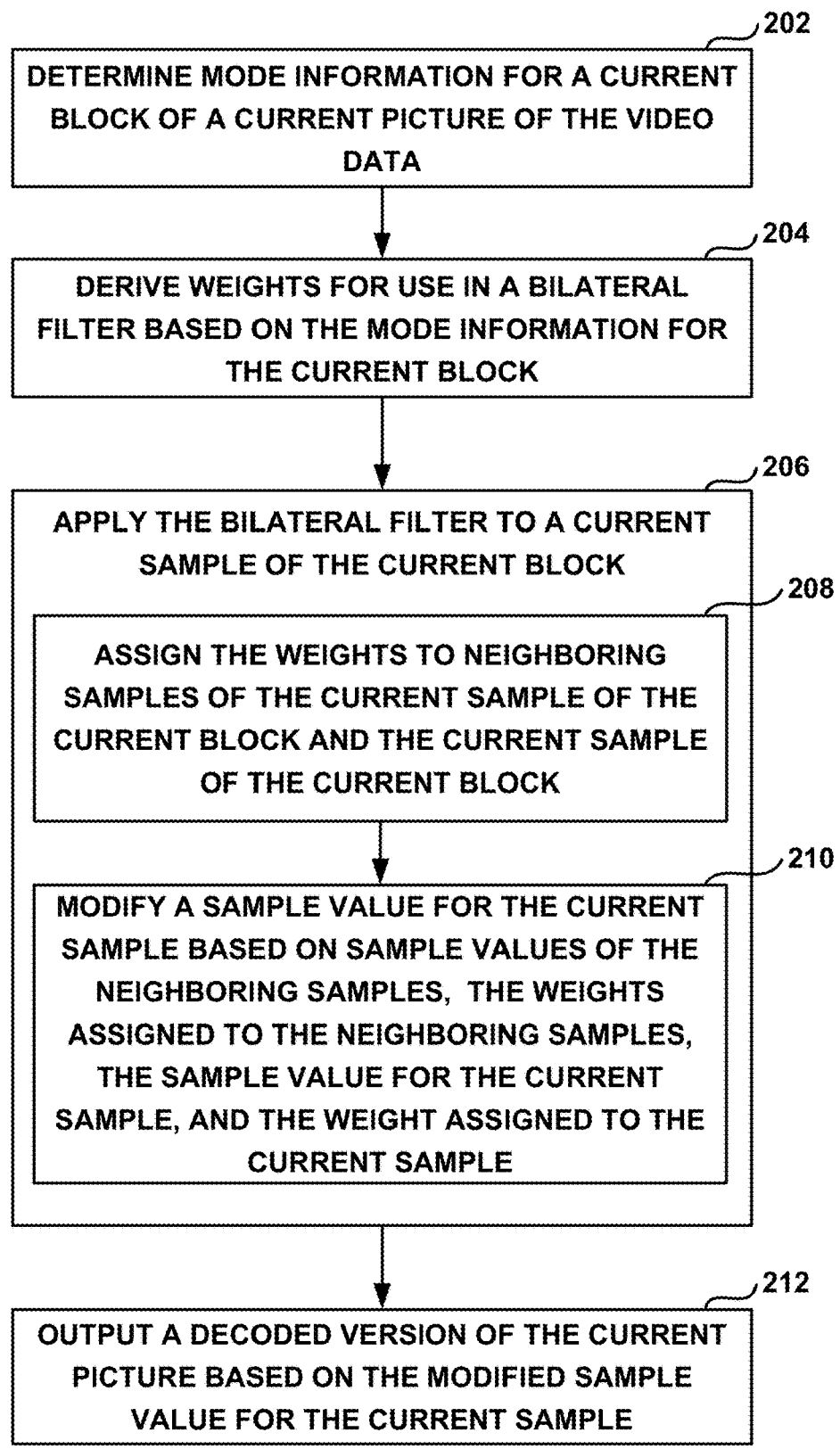
FIG. 9 is a flowchart illustrating an example operation of a video decoder, in accordance with a technique of this disclosure.

FIG. 9 is a flowchart illustrating an example operation of a video decoder for decoding video data in accordance with a technique of this disclosure. The video decoder described with respect to FIG. 9 may, for example, be a video decoder, such as video decoder 30, for outputting displayable decoded video or may be a video decoder implemented in a video encoder, such as the decoding loop of video encoder 20, which includes inverse quantization unit 108, inverse transform processing unit 110, filter unit 114, and reference picture buffer 116.

In accordance with the techniques of FIG. 9, the video decoder determines mode information for a current block of a current picture of the video data (202). The video decoder derives weights for use in bilateral filtering based on the mode information for the current block (204). To determine the mode information for the current block of the current picture of the video data, the video decoder may, for example, determine that the current block is an intra predicted block and derive the weights based on the current block being an intra predicted block. In other examples, to determine the mode information for the current block of the current picture of the video data, the video decoder may determine that the current block is an inter predicted block and derive the weights based on the current block being an inter predicted block.

In another example, to determine the mode information for the current block of the current picture of the video data, the video decoder may determine an intra prediction mode for the current block and derive the weights based on the intra prediction mode. To determine the mode information for the current block of the current picture of the video data, the video decoder may, for example, determine motion information for the current block and derive the weights for use in the bilateral filter based on the motion information for the current block. In another example, to determine the mode information for the current block of the current picture of the video data, the video decoder may determine that the current block is encoded using an inter prediction mode with affine motion or an inter prediction mode with translational motion and derive the weights based on the current block being encoded using the inter prediction mode with affine motion or the inter prediction mode with translational motion. In yet another example, to determine the mode information for the current block of the current picture of the video data, the video decoder may perform at least one of determining a transform type for the current block (e.g., DCT or DST) or determining that the current block includes no non-zero transform coefficients and derive the weights based on at least one of the transform type or the current block including no non-zero transform coefficients.

To derive the weights for use in the bilateral filter based on the mode information for the current block, the video decoder may further, for example, determine a value for a range parameter based on a quantization parameter for the current block, determine a value for a spatial parameter, and derive the weights for use in the bilateral filter based on the range parameter and the spatial parameter. In some examples, the video decoder may determine, based on the mode information, a coding context to use for entropy decoding a parameter for the bilateral filter and use the determined coding context to entropy decode the parameter.

The video decoder may also determine mode information for a second current block of the current picture of the video data, and based on the mode information for the second current block of the current picture, determine whether the bilateral filter is enabled or disabled for the current block. The mode information used to determine whether bilateral filtering is enabled or disabled for the second current block may be the same mode information discussed above with respect to deriving weights for bilateral filtering of the current block. In one example, the bilateral filter may be disabled if one block is coded with the skip mode, and enabled for the remaining modes.

The video decoder applies the bilateral filter to a current sample of the current block (206). To apply the bilateral filter to the current sample, the video decoder assigns the weights to neighboring samples of the current sample of the current block and to the current sample of the current block (208) and modifies a sample value for the current sample based on sample values of the neighboring samples, the weights assigned to the neighboring samples, the sample value for the current sample, and the weight assigned to the current sample (210). The current sample may be either a luma sample or a chroma sample.

Based on the modified sample value for the current sample, the video decoder outputs a decoded version of the current picture (212). When the video decoder is a video decoder configured to output displayable decoded video, then the video decoder may, for example, output the decoded version of the current picture to a display device. When the decoding is performed as part of a decoding loop of a video encoding process, then the video decoder may, after applying the bilateral filter to the current sample, store the decoded version of the current picture as a reference picture for use in encoding another picture of the video data.

Figure 10:
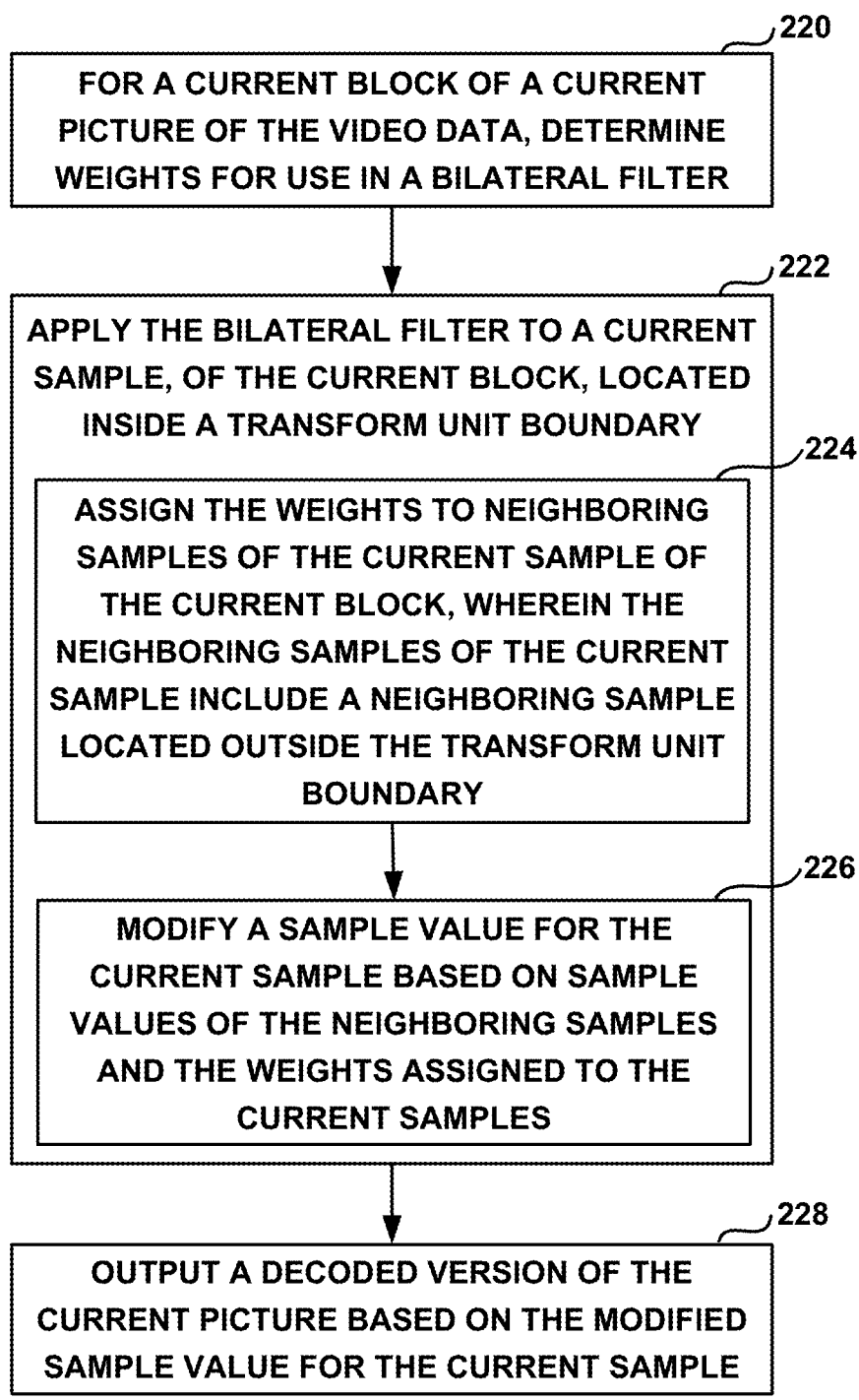
FIG. 10 is a flowchart illustrating an example operation of a video decoder, in accordance with a technique of this disclosure.

FIG. 10 is a flowchart illustrating an example operation of a video decoder for decoding video data in accordance with a technique of this disclosure. The video decoder described with respect to FIG. 10 may, for example, be a video decoder, such as video decoder 30, for outputting displayable decoded video or may be a video decoder implemented in a video encoder, such as the decoding loop of video encoder 20, which includes inverse quantization unit 108, inverse transform processing unit 110, filter unit 114, and reference picture buffer 116.

In accordance with the techniques of FIG. 10, the video decoder determines weights for use in bilateral filtering for a current block of a current picture of the video data (220). To determine the weights for use in the bilateral filter, the video decoder may determine a value for a range parameter (e.g., equation 4 above) based on a quantization parameter for the current block, determine a value for a spatial parameter (e.g., equation 3 above) based on values of reconstructed samples of the current block, and determine the weights for use in the bilateral filter based on the range parameter and the spatial parameter.

The video decoder applies the bilateral filter to a current sample, of the current block, located inside a transform unit boundary block (222). The current block may, for example, be a reconstructed block formed by adding a predictive block to a residual block, and the residual block may define the transform unit boundary. In some examples, the current block may be a part of an LCU. The LCU may include a first CU and a second CU, and the first CU may include the current block and a TU. The TU may define the transform unit boundary.

To apply the bilateral filter to the current sample, the video decoder assigns the weights to neighboring samples of the current sample of the current block (224). The neighboring samples of the current sample include a neighboring sample located outside the transform unit boundary. To apply the bilateral filter to the current sample, the video decoder modifies a sample value for the current sample based on sample values of the neighboring samples and the weights assigned to the current samples (226).

The video decoder may, for example, determine that the neighboring sample located outside the transform unit boundary is available for the bilateral filter in response to the neighboring sample located outside the transform unit boundary and the current sample being located in a same largest coding unit. The video decoder may, for example, determine that the neighboring sample located outside the transform unit boundary is available for the bilateral filter in response to the neighboring sample located outside the transform unit boundary and the current sample being located in a same largest coding unit row. The video decoder may, for example, determine that the neighboring sample located outside the transform unit boundary is available for the bilateral filter in response to the neighboring sample located outside the transform unit boundary and the current sample being located in a same slice. The video decoder may, for example, determine that the neighboring sample located outside the transform unit boundary is available for the bilateral filter in response to the neighboring sample located outside the transform unit boundary and the current sample being located in a same tile.

In other examples, the video decoder may determine that the neighboring sample located outside the transform unit boundary is unavailable for the bilateral filter, and in response to determining that the neighboring sample located outside the transform unit boundary is unavailable for the bilateral filter, derive a virtual sample value for the neighboring sample located outside the transform unit boundary. The video decoder may modify the sample value for the current sample based on sample values of the neighboring samples and the weights assigned to the current samples by modifying the sample value for the current sample based on the virtual sample value.

The video decoder outputs a decoded version of the current picture based on the modified sample value for the current sample (228). When the video decoder is a video decoder configured to output displayable decoded video, then the video decoder may, for example, output the decoded version of the current picture to a display device. When the decoding is performed as part of a decoding loop of a video encoding process, then the video decoder may, after applying the bilateral filter to the current sample, store the decoded version of the current picture as a reference picture for use in encoding another picture of the video data.

Certain aspects of this disclosure have been described with respect to extensions of the HEVC standard for purposes of illustration. However, the techniques described in this disclosure may be useful for other video coding processes, including other standard or proprietary video coding processes not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable. In this disclosure, the phrase "based on" may indicate based only on, based at least in part on, or based in some way on. This disclosure may use the term "video unit" or "video block" or "block" to refer to one or more sample blocks and syntax structures used to code samples of the one or more blocks of samples. Example types of video units may include CTUs, CUs, PUs, transform units (TUs), macroblocks, macroblock partitions, and so on. In some contexts, discussion of PUs may be interchanged with discussion of macroblocks or macroblock partitions. Example types of video blocks may include coding tree blocks, coding blocks, and other types of blocks of video data.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processing circuits to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Functionality described in this disclosure may be performed by fixed function and/or programmable processing circuitry. For instance, instructions may be executed by fixed function and/or programmable processing circuitry. Such processing circuitry may include one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements. Processing circuits may be coupled to other components in various ways. For example, a processing circuit may be coupled to other components via an internal device interconnect, a wired or wireless network connection, or another communication medium.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for decoding video data, the method comprising:
   determining first mode information for a first block of a current picture of the video data wherein determining the first mode information for the first block of the current picture comprises determining that the first block is an intra predicted block;
   deriving first weights for use in a bilateral filter based on the first block being intra predicted;
   applying the bilateral filter to a first current sample of the first block, wherein applying the bilateral filter to the first current sample comprises:
      assigning the first weights to first neighboring samples of the first current sample of the first block and to the first current sample of the first current block; and
      modifying a sample value for the first current sample based on sample values of the first neighboring samples, the first weights assigned to the first neighboring samples, the sample value for the first current sample, and the weight assigned to the first current sample;
   determining second mode information for a second block of the current picture of the video data, wherein determining the second mode information for the second block of the current picture comprises determining that the second block is an inter predicted block;
   deriving second weights, for use in the bilateral filter, that define a weaker filter than the first weights based on the second block being inter predicted;
   applying the bilateral filter to a second current sample of the second block, wherein applying the bilateral filter to the second current sample comprises:
      assigning the second weights to second neighboring samples of the second current sample of the second block and to the second current sample of the second current block; and modifying a sample value for the second current sample based on sample values of the second neighboring samples, the second weights assigned to the second neighboring samples, the sample value for the second current sample, and the weight assigned to the second current sample; and based on the modified sample value for the first current sample and the modified sample value for the second current sample, outputting a decoded version of the current picture.

2. The method of claim 1, further comprising:

determining, based on the first mode information, a coding context to use for entropy decoding a parameter for the bilateral filter; and using the determined coding context to entropy decode the parameter.

3. The method of claim 1, further comprising:

determining mode information for a third block of the current picture of the video data; and based on the mode information for the third block of the current picture, determining that bilateral filtering is disabled for the third block.

4. The method of claim 1, further comprising:

based on the first mode information for the first block of the current picture, determining that bilateral filtering is enabled for the first block.

5. The method of claim 1, wherein determining the second mode information for the second block of the current picture of the video data comprises determining motion information for the second block, and wherein deriving the weights for use in the bilateral filter based on the second mode information for the second block comprises deriving the weights based on the motion information for the second block.

6. The method of claim 1, wherein determining the second mode information for the second block of the current picture of the video data comprises determining that the second block is encoded using an inter prediction mode with affine motion or an inter prediction mode with translational motion, and wherein deriving the weights for use in the bilateral filter based on the second mode information for the second block comprises deriving the weights based on the second block being encoded using the inter prediction mode with affine motion or the inter prediction mode with translational motion.

7. The method of claim 1, wherein the current sample comprises a chroma sample.

8. The method of claim 1, wherein the method of decoding is performed as part of a decoding loop of a video encoding process, the method further comprising:

after applying the bilateral filter to the first current sample and the second current sample, using the decoded version of the current picture as a reference picture in encoding another picture of the video data.

9. The method of claim 1, wherein outputting the decoded version of the current picture comprises outputting the decoded version of the current picture to a display device.

10. A device for decoding video data, the apparatus comprising:

one or more storage media configured to store the video data; and one or more processors configured to:
  determine first mode information for a first block of a current picture of the video data, wherein determining the first mode information for the first block of the current picture comprises determining that the first block is an intra predicted block;
  derive first weights for use in a bilateral filter based on the first block being intra predicted;
  apply the bilateral filter to a first current sample of the first block, wherein to apply the bilateral filter to the first current sample, the one or more processors are further configured to:
    assign the first weights to first neighboring samples of the first current sample of the first block and to the first current sample of the first current block; and
    modify a sample value for the first current sample based on sample values of the first neighboring samples, the first weights assigned to the first neighboring samples, the sample value for the first current sample, and the weight assigned to the first current sample;
  determine second mode information for a second block of the current picture of the video data, wherein determining the second mode information for the second block of the current picture comprises determining that the second block is an inter predicted block;
  derive second weights, for use in the bilateral filter, that define a weaker filter than the first weights based on the second block being inter predicted;
  apply the bilateral filter to a second current sample of the second block, wherein to apply the bilateral filter to the second current sample, the one or more processors are further configured to:
    assign the second weights to second neighboring samples of the second current sample of the second block and to the second current sample of the second current block; and
    modify a sample value for the second current sample based on sample values of the second neighboring samples, the second weights assigned to the second neighboring samples, the sample value for the second current sample, and the weight assigned to the second current sample; and
  based on the modified sample value for the first current sample and the modified sample value for the second current sample, output a decoded version of the current picture.

11. The device of claim 10, wherein the one or more processors are further configured to:

determine, based on the first mode information, a coding context to use for entropy decoding a parameter for the bilateral filter; and use the determined coding context to entropy decode the parameter.

12. The device of claim 10, wherein the one or more processors are further configured to:

determine mode information for a third current block of the current picture of the video data; and based on the mode information for the third current block of the current picture, determine that bilateral filtering is disabled for the third block.

13. The device of claim 10, wherein the one or more processors are further configured to:

based on the first mode information for the first current block of the current picture, determine that bilateral filtering is enabled for the first block.

14. The device of claim 10, wherein to determine the second mode information for the second block of the current picture of the video data, the one or more processors are further configured to determine motion information for the second block, and wherein to derive the weights for use in the bilateral filter based on the second mode information for the second block, the one or more processors are further configured to derive the weights based on the motion information for the second block.

15. The device of claim 10, wherein to determine the second mode information for the second block of the current picture of the video data, the one or more processors are further configured to determine that the second block is encoded using an inter prediction mode with affine motion or an inter prediction mode with translational motion, and wherein to derive the weights for use in the bilateral filter based on the second mode information for the second block, the one or more processors are further configured to derive the weights based on the second block being encoded using the inter prediction mode with affine motion or the inter prediction mode with translational motion.

16. The device of claim 10, wherein the current sample comprises a chroma sample.

17. The device of claim 10, wherein to output the decoded version of the current picture, the one or more processors are configured to output the decoded version of the current picture to a display device.

18. The device of claim 10, wherein the one or more processors are configured to:
decode the video data as part of a decoding loop of a video encoding process; and
after applying the bilateral filter to the first current sample and the second current sample, use the decoded version of the current picture as a reference picture in encoding another picture of the video data.

19. The device of claim 18, wherein the device comprises a wireless communication device, further comprising a transmitter configured to transmit encoded video data.

20. The device of claim 19, wherein the wireless communication device comprises a telephone handset and wherein the transmitter is configured to modulate, according to a wireless communication standard, a signal comprising the encoded video data.

21. The device of claim 10, wherein the device comprises a wireless communication device, further comprising a receiver configured to receive encoded video data.

22. The device of claim 21, wherein the wireless communication device comprises a telephone handset and wherein the receiver is configured to demodulate, according to a wireless communication standard, a signal comprising the encoded video data.

23. A non-transitory computer readable storage medium storing instructions that when executed by one or more processors cause the one or more processors to:
determine first mode information for a first block of a current picture of the video data, wherein determining the first mode information for the first block of the current picture comprises determining that the first block is an intra predicted block;
derive first weights for use in a bilateral filter based on the first block being intra predicted;
apply the bilateral filter to a first current sample of the first block, wherein to apply the bilateral filter to the first current sample, wherein to apply the bilateral filter to the first current sample, the instructions cause the one or more processors to:
assign the first weights to first neighboring samples of the first current sample of the first block and to the first current sample of the first current block; and
modify a sample value for the first current sample based on sample values of the first neighboring samples, the first weights assigned to the first neighboring samples, the sample value for the first current sample, and the weight assigned to the first current sample;
determine second mode information for a second block of the current picture of the video data, wherein determining the second mode information for the second block of the current picture comprises determining that the second block is an inter predicted block;
derive second weights, for use in the bilateral filter, that define a weaker filter than the first weights based on the second block being inter predicted;
apply the bilateral filter to a second current sample of the second block, wherein to apply the bilateral filter to the second current sample, the instructions cause the one or more processors to:
assign the second weights to second neighboring samples of the second current sample of the second block and to the second current sample of the second current block; and
modify a sample value for the second current sample based on sample values of the second neighboring samples, the second weights assigned to the second neighboring samples, the sample value for the second current sample, and the weight assigned to the second current sample; and
based on the modified sample value for the first current sample and the modified sample value for the second current sample, output a decoded version of the current picture.

24. The non-transitory computer readable storage medium of claim 23 storing further instructions that when executed the by the one or more processors cause the one or more processors to:
determine, based on the first mode information, a coding context to use for entropy decoding a parameter for the bilateral filter; and
use the determined coding context to entropy decode the parameter.

25. The non-transitory computer readable storage medium of claim 23 storing further instructions that when executed the by the one or more processors cause the one or more processors to:
determine mode information for a third block of the current picture of the video data; and
based on the mode information for the third block of the current picture, determine that bilateral filtering is disabled for the third block.

26. The non-transitory computer readable storage medium of claim 23 storing further instructions that when executed by the one or more processors cause the one or more processors to:
based on the first mode information for the first block of the current picture, determine that bilateral filtering is enabled for the first block.

27. An apparatus for decoding video data, the apparatus comprising:
means for determining first mode information for a first block of a current picture of the video data, wherein the means for determining the first mode information for the first block of the current picture comprises means for determining that the first block is an intra predicted block;
means for deriving first weights for use in a bilateral filter based on the first block being intra predicted;

means for applying the bilateral filter to a first current sample of the first block, wherein the means for applying the bilateral filter to the first current sample comprises:

means for assigning the first weights to first neighboring samples of the first current sample of the first block and to the first current sample of the first current block; and means for modifying a sample value for the first current sample based on sample values of the first neighboring samples, the first weights assigned to the first neighboring samples, the sample value for the first current sample, and the weight assigned to the first current sample;

means for determining second mode information for a second block of the current picture of the video data, wherein determining the second mode information for the second block of the current picture comprises determining that the second block is an inter predicted block;

means for deriving second weights, for use in the bilateral filter, that define a weaker filter than the first weights based on the second block being inter predicted;

means for applying the bilateral filter to a second current sample of the second block, wherein the means for applying the bilateral filter to the second current sample comprises:

means for assigning the second weights to second neighboring samples of the second current sample of the second block and to the second current sample of the second current block; and means for modifying a sample value for the second current sample based on sample values of the second neighboring samples, the second weights assigned to the second neighboring samples, the sample value for the second current sample, and the weight assigned to the second current sample; and means for outputting a decoded version of the current picture based on the modified sample value for the first current sample and the modified sample value for the second current sample.

* * * * *